United States Patent
Wang et al.

(10) Patent No.: US 10,313,916 B2
(45) Date of Patent: Jun. 4, 2019

(54) SELECTED IP FLOW ULTRA LOW LATENCY

(71) Applicant: QUALCOMM Incorporated, San Diego, CA (US)

(72) Inventors: Jun Wang, Poway, CA (US); Ozcan Ozturk, San Diego, CA (US); Miguel Griot, La Jolla, CA (US); Ravindra Manohar Patwardhan, San Diego, CA (US); Onkar Jayant Dabeer, San Diego, CA (US); Madhavan Srinivasan Vajapeyam, San Diego, CA (US); Jelena Damnjanovic, Del Mar, CA (US); Aleksandar Damnjanovic, Del Mar, CA (US); Taesang Yoo, Riverside, CA (US); Yongbin Wei, La Jolla, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/937,017

(22) Filed: Nov. 10, 2015

(65) Prior Publication Data

US 2016/0135072 A1 May 12, 2016

Related U.S. Application Data

(60) Provisional application No. 62/078,210, filed on Nov. 11, 2014.

(51) Int. Cl.
*H04W 8/08* (2009.01)
*H04W 28/02* (2009.01)
(Continued)

(52) U.S. Cl.
CPC ....... *H04W 28/0236* (2013.01); *H04W 8/082* (2013.01); *H04W 28/0252* (2013.01);
(Continued)

(58) Field of Classification Search
CPC . H04W 28/0236; H04W 8/082; H04W 40/24; H04W 88/16; H04W 36/08;
(Continued)

(56) References Cited

U.S. PATENT DOCUMENTS

| 8,861,477 B1* | 10/2014 | Goyal | H04W 36/0083 |
| | | | 370/331 |
| 2006/0203724 A1* | 9/2006 | Ghosh | H04L 47/10 |
| | | | 370/229 |

(Continued)

FOREIGN PATENT DOCUMENTS

EP 2900005 A1 7/2015

OTHER PUBLICATIONS

ISA/EPO, International Search Report and Written Opinion of the International Searching Authority, Int'l. App. No. PCT/US2015/060154, dated Feb. 5, 2016, European Patent Office, Rijswijk, NL, 12 pgs.

Primary Examiner — Mohammad S Anwar
(74) Attorney, Agent, or Firm — Holland & Hart LLP

(57) ABSTRACT

Methods, systems, and devices are described for decreasing user plane latency in a wireless communication system. This may include routing a portion of bearer traffic to or from a UE through a local or serving gateway, or within or between base stations, rather than via the core network. In some examples, techniques for selected internet protocol flow ultra-low latency (SIPFULL) for systems in which users may have subscribed to enhanced services may be employed. The network may, for instance, authorize SIPFULL functionalities for UEs per access point name (APN)

(Continued)

based on individual services subscribed by the UE to improve overall quality of service (QoS). In some examples, a UEs latency requirements or SIPFULL authorizations may affect mobility operations.

30 Claims, 26 Drawing Sheets

(51) Int. Cl.
    *H04W 28/06*     (2009.01)
    *H04W 36/00*     (2009.01)
    *H04W 36/12*     (2009.01)
    *H04W 40/24*     (2009.01)
    *H04W 88/16*     (2009.01)

(52) U.S. Cl.
    CPC ....... *H04W 28/0268* (2013.01); *H04W 28/06* (2013.01); *H04W 40/24* (2013.01); *H04W 88/16* (2013.01); *H04W 36/0011* (2013.01); *H04W 36/125* (2018.08)

(58) Field of Classification Search
    CPC ......... H04W 36/0044; H04W 28/0268; H04W 28/052; H04W 36/0011
    See application file for complete search history.

(56) References Cited

U.S. PATENT DOCUMENTS

| | | | |
|---|---|---|---|
| 2007/0123267 A1* | 5/2007 | Whinnett | H04W 36/18 455/452.2 |
| 2008/0192629 A1* | 8/2008 | Chari | H04L 12/5693 370/230 |
| 2008/0259873 A1* | 10/2008 | Ahmavaara | H04W 36/0033 370/331 |
| 2009/0016265 A1* | 1/2009 | Katayama | H04L 1/1887 370/328 |
| 2011/0235546 A1 | 9/2011 | Horn et al. | |
| 2012/0207092 A1* | 8/2012 | Zirwas | H04L 5/0073 370/328 |
| 2013/0003697 A1 | 1/2013 | Adjakple et al. | |
| 2014/0098680 A1 | 4/2014 | Anthony, Jr. et al. | |
| 2014/0112236 A1* | 4/2014 | Jung | H04W 76/002 370/312 |
| 2014/0113637 A1* | 4/2014 | Guan | H04W 8/082 455/437 |
| 2014/0226641 A1* | 8/2014 | Kim | H04W 4/005 370/338 |
| 2014/0269755 A1* | 9/2014 | Veiga | H04L 49/9005 370/429 |
| 2015/0257141 A1* | 9/2015 | Kulal | H04W 72/0406 370/329 |

* cited by examiner

SELECTED IP FLOW ULTRA LOW LATENCY

CROSS REFERENCES

The present application for patent claims priority to U.S. Provisional Patent Application No. 62/078,210 by Wang et al., entitled "Selected IP Flow Ultra Low Latency," filed Nov. 11, 2014, assigned to the assignee hereof, and expressly incorporated by reference herein.

BACKGROUND

Field of Disclosure

The following relates generally to wireless communication, and more specifically to selected internet protocol (IP) flow ultra-low latency.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system).

By way of example, a wireless multiple-access communications system may include a number of base stations, each simultaneously supporting communication for multiple communication devices, which may be otherwise known as user equipment (UEs). A base station may communicate with the communication devices on downlink channels (e.g., for transmissions from a base station to a UE) and uplink channels (e.g., for transmissions from a UE to a base station).

Data originating from or terminating at UEs may be routed via base stations and through an operator's core network. So the path for data between any two UEs may be circuitous, which may negatively impact end-to-end latency associated with such communications. Furthermore, the routing may not take full advantage of a UE's capabilities.

SUMMARY

Systems, methods, and apparatuses for decreased user plane latency are described. These may include techniques for addressing end-to-end user plane latency issues with selected internet protocol flow ultra-low latency (SIPFULL). A network may, for example, enable SIPFULL for UEs according to the capabilities and subscriptions of a particular UE. In some cases, SIPFULL may be enabled on a per-access point name (APN) basis. The network may thus support a UE's quality of service (QoS) requirements by routing bearer traffic through a local gateway or a serving gateway or by routing bearer traffic within a base station or directly between base stations.

A method of wireless communication is described. The method may include determining a latency mode of a first UE, enabling low latency IP packet routing for the first UE based at least in part on the latency mode of the first UE, and selecting a local gateway (LGW) for the low latency IP packet routing based at least in part on the low latency mode of the first UE.

An apparatus for wireless communication is described. The apparatus may include means for determining a latency mode of a first UE, means for enabling low latency IP packet routing for the first UE based at least in part on the latency mode of the first UE, and means for selecting a local gateway (LGW) for the low latency IP packet routing based at least in part on the low latency mode of the first UE.

A further apparatus for wireless communication is described. The apparatus may include a processor, memory in electronic communication with the processor, and instructions stored in the memory. The instructions may be executable by the processor to determine a latency mode of a first UE, enable low latency IP packet routing for the first UE based at least in part on the latency mode of the first UE, and select a local gateway (LGW) for the low latency IP packet routing based at least in part on the low latency mode of the first UE.

A non-transitory computer-readable medium storing code for wireless communication at a base station is described. The code may include instructions executable to determine a latency mode of a first UE, enable low latency IP packet routing for the first UE based at least in part on the latency mode of the first UE, and select a local gateway (LGW) for the low latency IP packet routing based at least in part on the low latency mode of the first UE.

In some examples of the method, apparatuses, or non-transitory computer-readable medium described above, the low latency IP packet routing may be enabled for an access point name (APN) associated with the latency mode of the first UE. Additionally or alternatively, in some examples the LGW is selected based on the APN.

Some examples of the method, apparatuses, or non-transitory computer-readable medium described above may further include features, means, or instructions for determining a QoS for each bearer configured for the first UE, and selecting the LGW based at least in part on the determined QoS. Additionally or alternatively, in some examples the LGW is collocated with a base station.

In some examples of the method, apparatuses, or non-transitory computer-readable medium described above, the LGW is collocated with a serving gateway (SGW) within a core network. Additionally or alternatively, some examples may include determining that the first UE and a second UE are connected to a common base station, determining that a latency mode of the second UE is the same as the latency mode of the first UE, and routing packet data traffic between the first and second UEs within the common base station based on determining that the latency mode of the second UE is the same as the latency mode of the first UE.

In some examples of the method, apparatuses, or non-transitory computer-readable medium described above, the packet data traffic comprises IP packet data, and the routing is via the LGW. Additionally or alternatively, in some examples, the LGW is collocated with the common base station.

In some examples of the method, apparatuses, or non-transitory computer-readable medium described above, the packet data traffic comprises packet data, and the routing is at a packet data convergence protocol (PDCP) or lower layer. Additionally or alternatively, some examples may include determining that the first UE is connected to a first base station and a second UE is connected to a second base station, where the first and second base stations are in communication via a direct backhaul link. Some examples may include determining that a latency mode of the second UE is the same as the latency mode of the first UE and routing packet data traffic between the first and second UEs over the direct backhaul link between the first and second base stations.

In some examples of the method, apparatuses, or non-transitory computer-readable medium described above, the packet data traffic comprises IP packet data, and the routing is via the LGW. Additionally or alternatively, in some examples, the LGW includes a first LGW collocated with the first base station, selecting a second LGW collocated with the second base station, and routing the packet data traffic via the first and second LGWs.

In some examples of the method, apparatuses, or non-transitory computer-readable medium described above, the LGW is collocated with a serving gateway (SGW) in a core network, and the routing may be via the LGW. Additionally or alternatively, in some examples, the packet data traffic includes packet data and the routing is at a packet data convergence protocol (PDCP) traffic or lower layer.

Some examples of the method, apparatuses, or non-transitory computer-readable medium described above may further include features, means, or instructions for determining that the first UE and a second UE are connected to a common SGW, determining that a latency mode of the second UE is the same as the latency mode of the first UE, and receiving packets routed between the first and second UEs from the SGW. Additionally or alternatively, some examples may include identifying a handover of the first UE from a source base station to a target base station, and maintaining service continuity relating to the low latency IP packet routing during the handover.

Some examples of the method, apparatuses, or non-transitory computer-readable medium described above may further include features, means, or instructions for sending a handover request, which may include a low latency IP routing indication from the source base station to the target base station. Additionally or alternatively, some examples may include receiving a handover acknowledgment comprising a low latency IP routing indication from the target base station at the source base station.

Some examples of the method, apparatuses, or non-transitory computer-readable medium described above may further include features, means, or instructions for selecting the target base station, by the source base station, based at least in part on a capability of the target base station to support the low latency IP packet routing. Additionally or alternatively, some examples may include receiving data at the source base station, transmitting the data to the first UE via the target base station using an IP address allocated by the LGW, determining that a data transfer to the first UE is complete, and receiving a UE context release from the target base station.

Some examples of the method, apparatuses, or non-transitory computer-readable medium described above may further include features, means, or instructions for sending a handover request comprising a low latency IP routing indication from the source base station to the target base station, receiving a handover acknowledgment comprising the low latency IP routing indication and an IP address from the target base station at the source base station, and transmitting the IP address from the source base station to the UE. Additionally or alternatively, some examples may include receiving a context request at the source base station from the target base station, sending a handover request in response to the context request from the source base station to the target base station, receiving a handover acknowledgment in response to the handover request at the source base station from the target base station. Additionally or alternatively, some examples may include sending a status transfer message in response to the handover acknowledgement from the source base station to the target base station and receiving a context release following the status transfer message upon a successful handover at the source base station from the target base station. Some examples of the method, apparatuses, or non-transitory computer-readable medium described above may further include features, means, or instructions for caching data at the LGW.

A further method of wireless communication at a UE is also described. The method may include transmitting a latency mode signal to a network, receiving an authorization signal for low latency IP packet routing based at least in part on the latency mode signal, and routing packets in accordance with the authorization signal via a local gateway (LGW) based at least in part on the authorization signal.

A further apparatus for wireless communication at a UE is also described. The apparatus may include means for transmitting a latency mode signal to a network, means for receiving an authorization signal for low latency IP packet routing based at least in part on the latency mode signal, and means for routing packets in accordance with the authorization signal via a local gateway (LGW) based at least in part on the authorization signal.

A further apparatus for wireless communication at a UE is also described. The apparatus may include a processor, memory in electronic communication with the processor, and instructions stored in the memory. The instructions may be executable by the processor to transmit a latency mode signal to a network, receive an authorization signal for low latency IP packet routing based at least in part on the latency mode signal, and route packets in accordance with the authorization signal via a local gateway (LGW) based at least in part on the authorization signal.

A further non-transitory computer-readable medium storing code for wireless communication at a UE is also described. The code may include instructions executable to transmit a latency mode signal to a network, receive an authorization signal for low latency IP packet routing based at least in part on the latency mode signal, and route packets in accordance with the authorization signal via a local gateway (LGW) based at least in part on the authorization signal.

In some examples of the method, apparatuses, or non-transitory computer-readable medium described above, the low latency IP packet routing is authorized for an access point name (APN) based on the latency mode signal or subscriber information, or both.

Some examples of the method, apparatuses, or non-transitory computer-readable medium described above may further include features, means, or instructions for transmitting a QoS indication to the network, where the authorization signal is based at least in part on the QoS indication. Additionally or alternatively, some examples may include determining that a UE is connected to a common base station, transmitting an intra-base station communication request to the network, and communicating with the UE via the common base station, where packet data traffic with the UE is routed within the common base station.

Some examples of the method, apparatuses, or non-transitory computer-readable medium described above may further include features, means, or instructions for transmitting a measurement report to a source base station and maintaining service continuity during a handover initiated based at least in part on the measurement report. Additionally or alternatively, some examples may include transmitting uplink data to the target base station utilizing an IP address allocated by the source LGW, receiving downlink data from the target base station utilizing the IP address allocated by the source LGW, where the downlink data may be routed via the source base station, and receiving a new IP address allocation from a target LGW associated with the target base station.

Some examples of the method, apparatuses, or non-transitory computer-readable medium described above may further include features, means, or instructions for receiving a new IP address allocation from a target LGW associated with the target base station, transmitting uplink data to the target base station utilizing an IP address allocated by the source LGW, receiving downlink data from the target base station utilizing the IP address allocated by the source LGW, where the downlink data may be routed via the source base station, and receiving an indication from a mobility management entity (MME) to utilize the new IP address. Additionally or alternatively, some examples may include receiving a new IP address allocated from a target LGW associated with the target base station, reestablishing a radio resource control (RRC) connection with the target base station, and communicating with the target base station utilizing the new IP address allocated from the target LGW.

Some examples of the method, apparatuses, or non-transitory computer-readable medium described above may further include features, means, or instructions for receiving, from an MME, a new IP address allocated from a target LGW associated with the target base station, reestablishing a RRC connection with the target base station, and communicating with the target base station utilizing the new IP address allocated form the target LGW.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
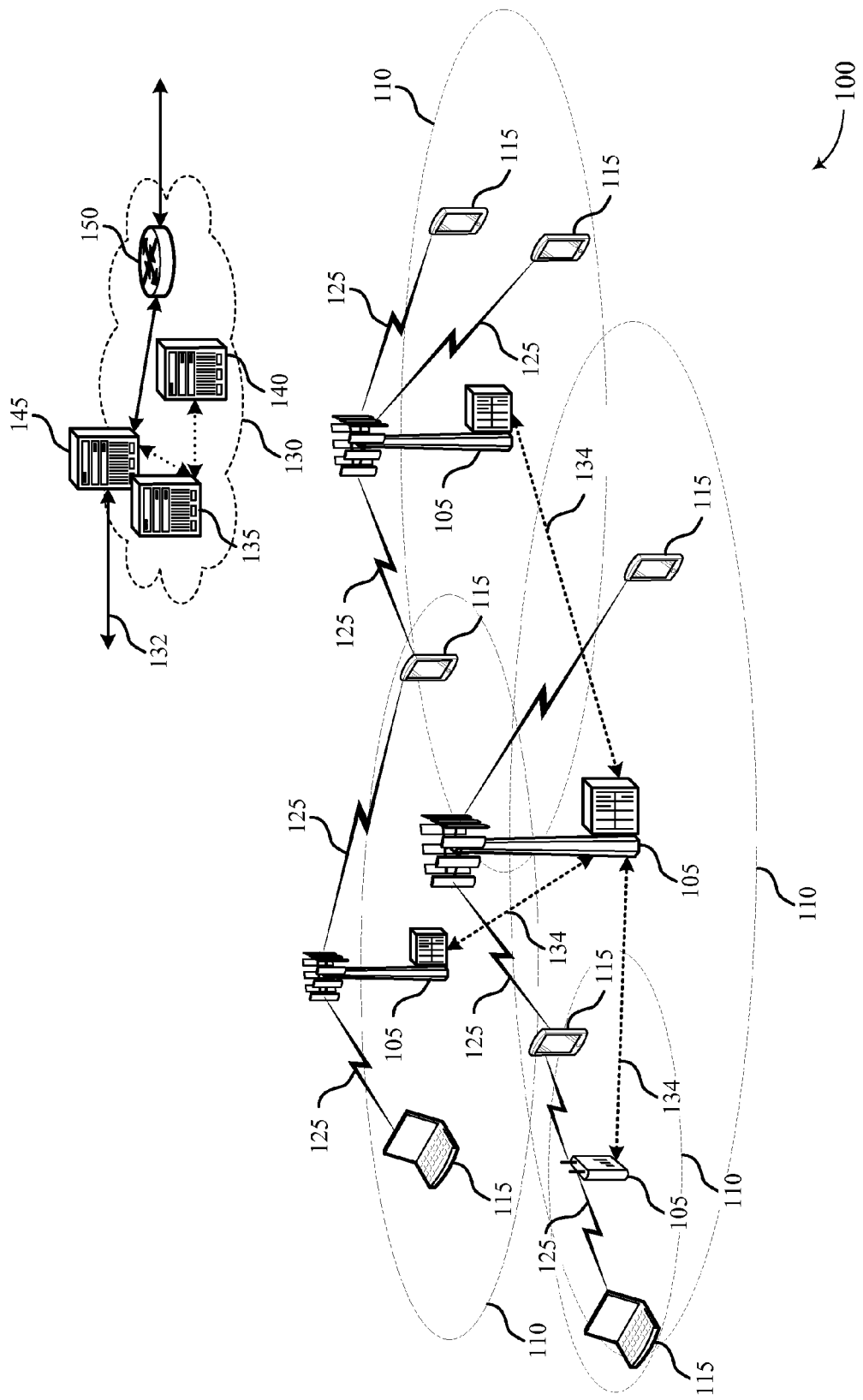
FIG. 1 illustrates an example of a wireless communications system in accordance with various aspects of the present disclosure.

A number of factors may contribute to end-to-end latency within a wireless communications system. For example, each component and each interface between components may affect the latency of communications between devices. In addition to latency associated with the transmissions between a user equipment (UE) and a base station, physical interfaces between the base station and various entities within a core network may cause delay. For example, backhaul links between the radio access network (RAN) (e.g., a base station) and entities with the core network may impart delay. Further, physical interfaces between devices within the core network (e.g., physical connections between gateways within the core network) may likewise impart delay. But modern communications often benefit from, or require, a lower latency operation than may be achievable by transmitting data from the RAN and through the core network. Additionally, UEs may have advanced capabilities, such as ultra-low latency capabilities, and existing routing techniques may not take advantage of these capabilities. For example, the network may not be aware of the capabilities of the UE and may route data irrespective of the UE capabilities.

The present disclosure thus provides techniques that may allow certain traffic within a system to be routed away from a core network and via alternate paths that may be available to various UEs. These techniques may be described as selected internet protocol (IP) for ultra-low latency (SIP-FULL). In various examples, traffic may be routed via a local gateway, within a serving gateway, within a base station, directly between base stations, or the like. The routing may depend on the latency mode of one or more UEs. For example, the network may determine the latency mode of a UE and then the network may choose an alternate data routing path. In some cases, the UE may inform the network of its capabilities. In some cases, a network, or a network operator, may enable SIPFULL on an access point name (APN) basis for various UEs capable of SIPFULL operation.

A network may also employ mobility procedures that support low latency (e.g., SIPFULL) operations. For example, for SIPFULL capable UEs, the network, or entities of the network (e.g., RAN), may maintain service continuity during the handover in an effort to ensure low latency operation. Such mobility procedures may include various methods of utilizing and allocating IP addresses by different entities of the system.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communications system 100 in accordance with various aspects of the present disclosure. The system 100 includes base stations 105, UEs 115, and a core network 130. The core network 130 may provide user authentication, access authorization, tracking, IP connectivity, and other access, routing, or mobility functions. The base stations 105 interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X1, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro or small cell base stations). There may be overlapping geographic coverage areas 110 for different technologies. In some examples, a local gateway (LGW) may be collocated with a base station 105, as described in further detail below.

A base station 105 may be connected by an S1 interface to the core network 130. The core network 130 may be an evolved packet core (EPC), which may include a mobility management entity (MME) 135, a home subscriber server (HSS) 140, a serving gateway (SGW) 145, and a packet data network (PDN) gateway (PGW) 150. User IP packets may be transferred through the SGW 145, which itself may be connected to the PGW 150. The PGW 150 may provide IP address allocation as well as other functions. The PGW 150 may be connected to the network operator's IP services. The operator's IP services may include the Internet, the Intranet, an IP Multimedia System (IMS), and a Packet-Switched (PS) Streaming Service (PSS). The functionality of the various network entities, including the MME 135 and HSS 140, is described in further detail below.

A macro cell generally covers a relatively large geographic area (e.g., several kilometers in radius) and may allow unrestricted access by UEs 115 with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack and data in the user plane may be based on the IP. A radio link control (RLC) layer may perform packet segmentation and reassembly to communicate over logical channels. A medium access control (MAC) layer may perform priority handling and multiplexing of logical channels into transport channels. The MAC layer may also use hybrid automatic repeat request (HARM) to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 shown in wireless communications system 100 may include uplink (UL) transmissions from a UE 115 to a base station 105, or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Wireless communications system 100 may support operation on multiple cells or carriers, a feature which may be referred to as carrier aggregation (CA) or multi-carrier operation. A carrier, which may be represented by communication links 125, may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, data (e.g., internet or voice over LTE (VoLTE) traffic) may be routed through the system via a number of intermediate entities. For instance, data from a UE 115 may be routed via communication link 125 to a base station 105, then from a base station 105 via a backhaul link 132 (e.g., an S1 interface) to the core network 130 to another user (not shown) via the internet. The latency associated with this communication may be a function of the various entities and physical connections between each end of this communications—e.g., between the UE 115 and a recipient of data at the other end—and may have a round trip time (RTT) on the order of 30 ms.

But, in some cases, data may be routed via a shorter path using SIPFULL, which may reduce end-to-end latency. For example, data may be routed via an LGW directly to the internet to avoid the path to and through the core network 130. In such cases, the latency may be reduced to the transmission time interval (TTI) of the transmission from the UE 115 to the base station, plus a delay associated with the RTT of HARQ, plus the time for communications between the base station 105 and the LGW and the time for communications from the LGW to the internet. With this approach, the delay associated with the backhaul 132, at least, may be avoided; and this delay is a function of the physical properties of the backhaul 132 (e.g., fiber or microwave) and may thus be relatively significant. This is discussed more fully below, with reference to FIG. 2A-2C.

In other cases, two UEs 115 may both be within the system 100, and data may be routed between them without the necessity of first navigating the core network. For example, two UEs 115 connected to a common base station 105 may have traffic between them routed within the base station 105 or LGW. In such cases, the latency may be reduced to a value equivalent to two (2) times the TTI plus the HARQ RTT plus the time for communications between the base station 105 and the LGW. Again, with this approach, the delay associated with backhaul 132 may be avoided. This is also discussed more fully below, with reference to FIG. 2A-2C.

Unlike some other selective IP routing protocols, SIPFULL may rely on UE latency requirements and authorizations, rather than best effort IP traffic offloading. In other words, the system 100 may determine the latency mode of a UE, and the network may choose routing based on the latency mode of the UE. In some cases, SIPFULL may be enabled within the system 100 for a given UE 115 based on an access point name (APN)—e.g., SIPFULL may be enabled upon determining a latency requirement for the UE 115.

APN may be the name of a gateway between a wireless network and another computer network (e.g., the internet). A UE 115 making a data connection, as opposed to, e.g., a circuit switched voice connection, may be configured with an APN, which it conveys upon accessing the network. A server of the core network 130 may then examine the APN to determine what type of network connection should be created (e.g., what IP or internet protocol multimedia system (IMS) address should be assigned or what security methods should be used). In other words, the APN may identify the packet data network (PDN) that a UE 115 wants to communicate with. In addition to identifying a PDN, an APN may also be used to define a service type (e.g., a wireless application protocol (WAP) server or multimedia messaging service (MMS)) that is provided by the PDN. In some examples, the HSS 140 enables (e.g., authorizes) SIPFULL on a per-APN basis for a UE 115. Additionally or alternatively, the MME 135 may select an LGW on a per-APN basis for a UE 115. In other examples, the MME 135 may also select an LGW based on a QoS for each bearer configured for a UE 115. Once enabled, the UE 115 may be charged for use of the LGW, which may be different than charges accrued for regular (e.g., non-SIPFULL operation).

In some cases, a UE 115 may be transferred from one base station 105 (e.g., a source base station) to another base station 105 (e.g., a target base station) with a mobility procedure, such as a handover. A network entity, such as a source base station 105 or MME 135 may identify a handover of a UE 115 with SIPFULL enabled, and the network entity may maintain service continuity for the UE 115, ensuring, or attempting to ensure, that latency requirements for the UE 115 are met.

Figure 2A:
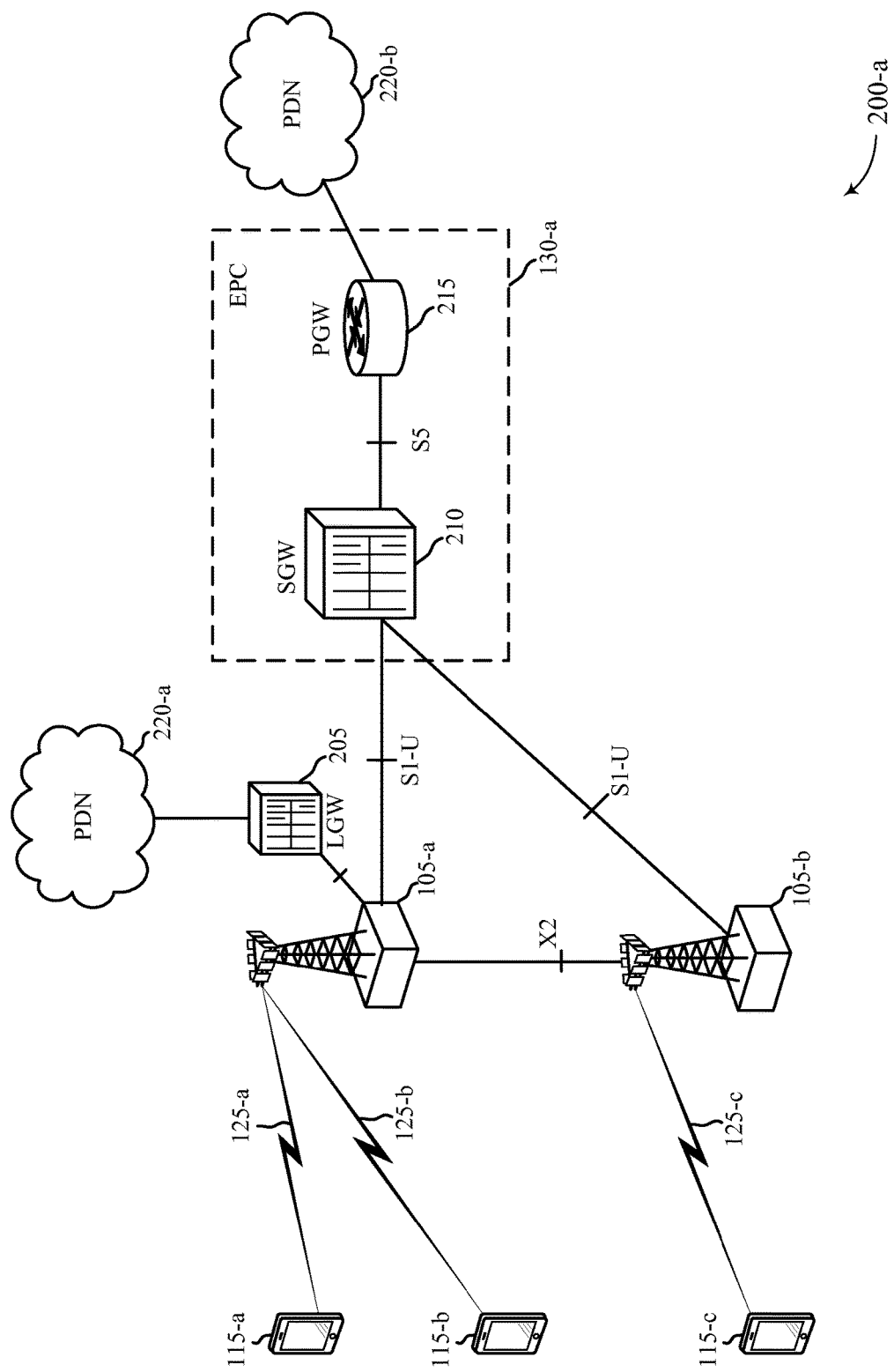
FIGS. 2A-2C illustrate examples of a wireless communications system or systems in accordance with various aspects of the present disclosure.
Figure 2B:
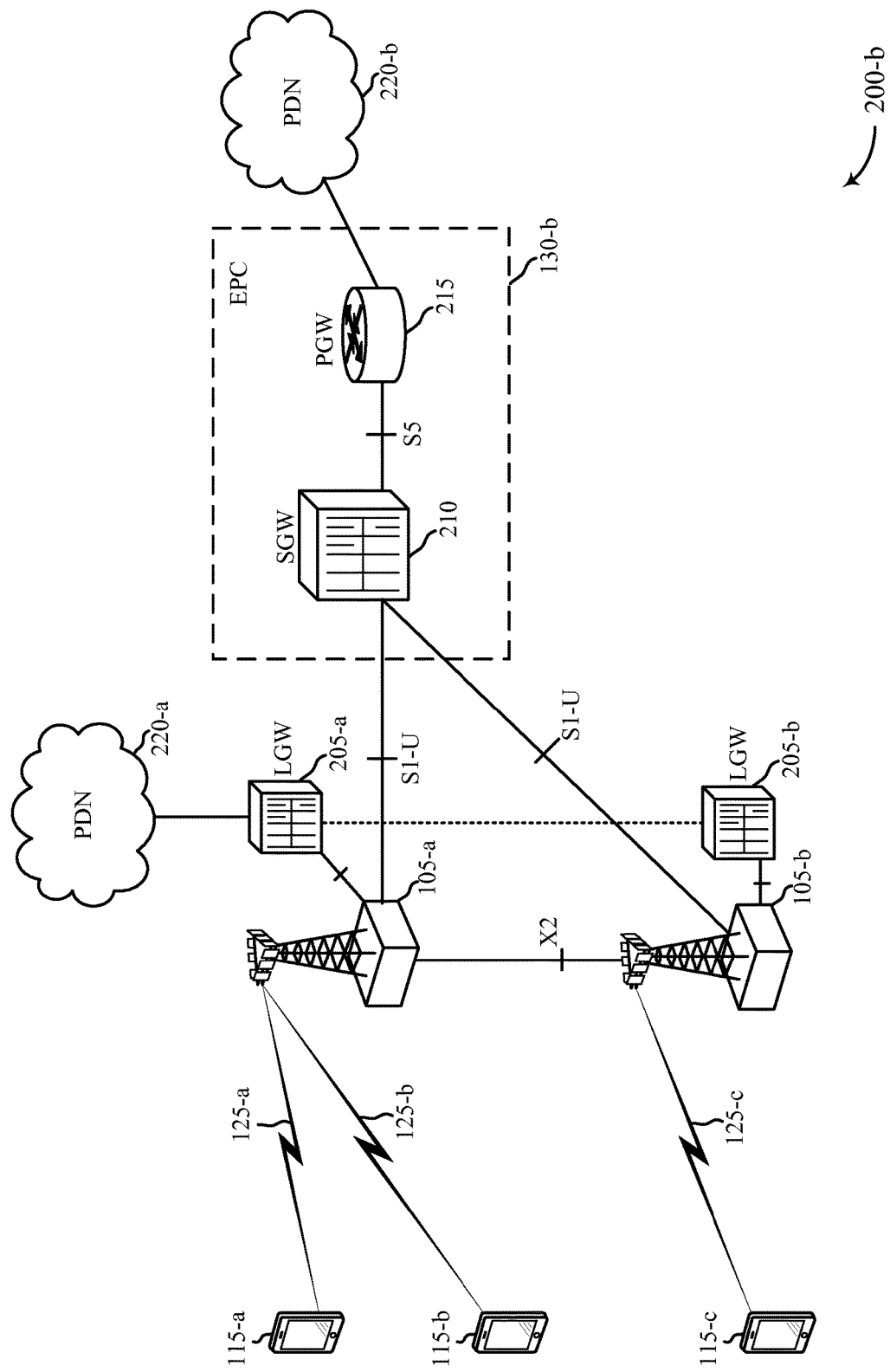
Figure 2C:
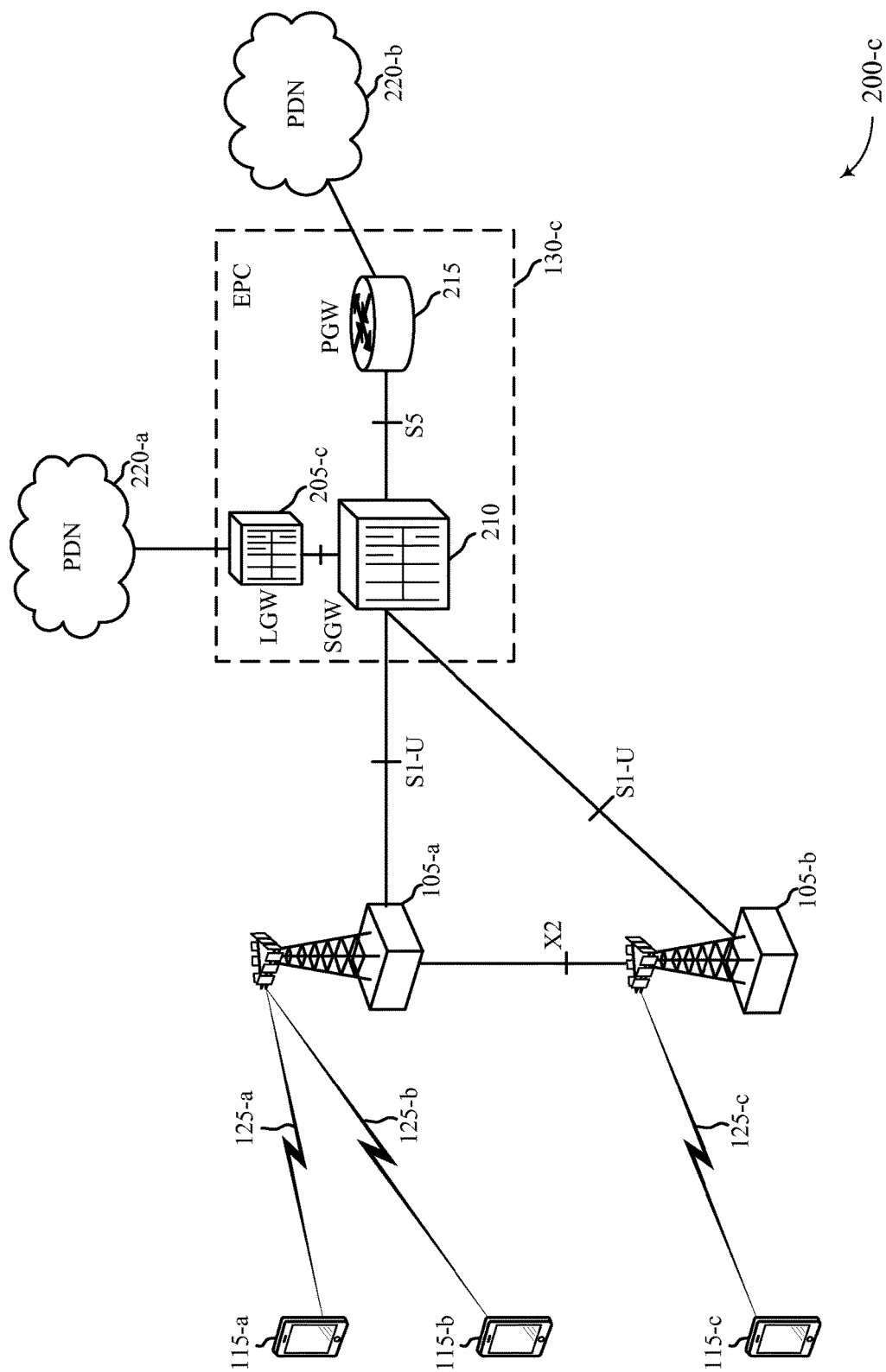

FIGS. 2A-2C illustrate examples of a wireless communication system 200 for SIPFULL in accordance with various aspects of the present disclosure. Wireless communications system 200 includes UEs 115 and base stations 105, which may be in communication via communication links 125, and which may be examples of UEs 115 and base stations 105 described above with reference to FIG. 1. Wireless communications system 200 may a include one or several LGWs 205 and an evolved packet core (EPC) 130-a. The EPC 130-a may be an example the core network 130 described above with reference to FIG. 1. The evolved packet core 130-a may include an SGW 210, and a PGW 215, which may be examples of the SGW 210 and PGW 140 of FIG. 1, respectively. The LGW 205 and the PGW 215 may provide access for the UEs 115 to the PDN (e.g., internet) 220.

The EPC 130-a may include an MME 135 (FIG. 1) and an HSS (FIG. 1). The MME may be a control node that processes signaling between the UEs 115 and the EPC 130-a. For example, the MME may provide bearer and connection management for the UE 115. The MME may also be responsible for idle mode UE 115, tracking and paging, bearer activation and deactivation, and serving gateway 210 or local gateway 205 selection for the UE 115. In some examples, the MME may select the local gateway 205 per APN. In other examples, the MME may select the LGW based on QoS for each bearer. The MME may communicate with the base stations 105, and may additionally authenticate the UEs 115 and implement non-access stratum (NAS) signaling with the UEs 115. The HSS may, among other functions, store subscriber data, manage roaming restrictions, manage accessible APNs for a subscriber, and associate subscribers with MMEs.

User IP packets transmitted through the EPC 130-a may be transferred through the serving gateway 210. According to the architecture of the system 200, the serving gateway 210 may be an aspect the user plane and act as mobility anchor for inter-eNB handovers and handovers between different radio access technologies (RATs). The PGW 215 may provide connectivity to one or more external packet data networks, such as PDN 220. The PDN 220 may include the internet, an intranet, an IP Multimedia System (IMS), a Packet-Switched (PS) Streaming Service (PSS), and/or other types of PDNs.

When SIPFULL is enabled, user-plane traffic between the UEs 115 and the PDN 220-b may be diverted from the EPC 130-a and offloaded to an SGi connection between the local gateway 205 base station 105-a and the PDN 220-a. To support bearer traffic over the SGi connection between the local gateway 205 and the PDN 220-a, the local gateway 205 may communicate with the serving gateway 210 over an S5 interface. SIPFULL may be enabled for a PDN connection of the UE 115 during connectivity activation if the MME determines, based on a set of network policies and/or subscription information for the UEs 115, that SIPFULL is permitted for the connection of the UEs 115. Upon determining that SIPFULL is permitted for the connection, the MME may set up SIPFULL bearers for the connection using the network address of the local gateway 205. The MME may determine the network address of the local gateway 205 based on communication with the base station 105-a (e.g., via S1 control messages), one or more operations administration and management (OAM) messages, or other communication sources.

As illustrated in FIG. 2A, some base stations 105, such as base station 105-a, may be configured with a collocated LGW 205. The base station 105-a may communicate with the neighbor base station 105-b using X2 common control messages. Accordingly, the base station 105-a may provide the network address of its local gateway 205 to the neighbor base station 105-b during a setup of the X2 interface. As a result, UE 115-c connected to the neighbor base station 105-b may be adapted to utilize SIPFULL by redirecting data traffic to PDN 220-a via local gateway 205. A network entity, such as the base station 105-a, LGW 205, or an entity within the EPC 130-a, may determine a latency mode of a UE 115 (e.g., UE 115-a). As illustrated in FIG. 2B, several base stations 105, such as base stations 105-a and 105-b may be configured with collocated LGWs 205. In other examples, as depicted in FIG. 2C, an LGW 205 may be associated or collocated with SGW 210, and may be referred to as a standalone LGW.

Figure 3:
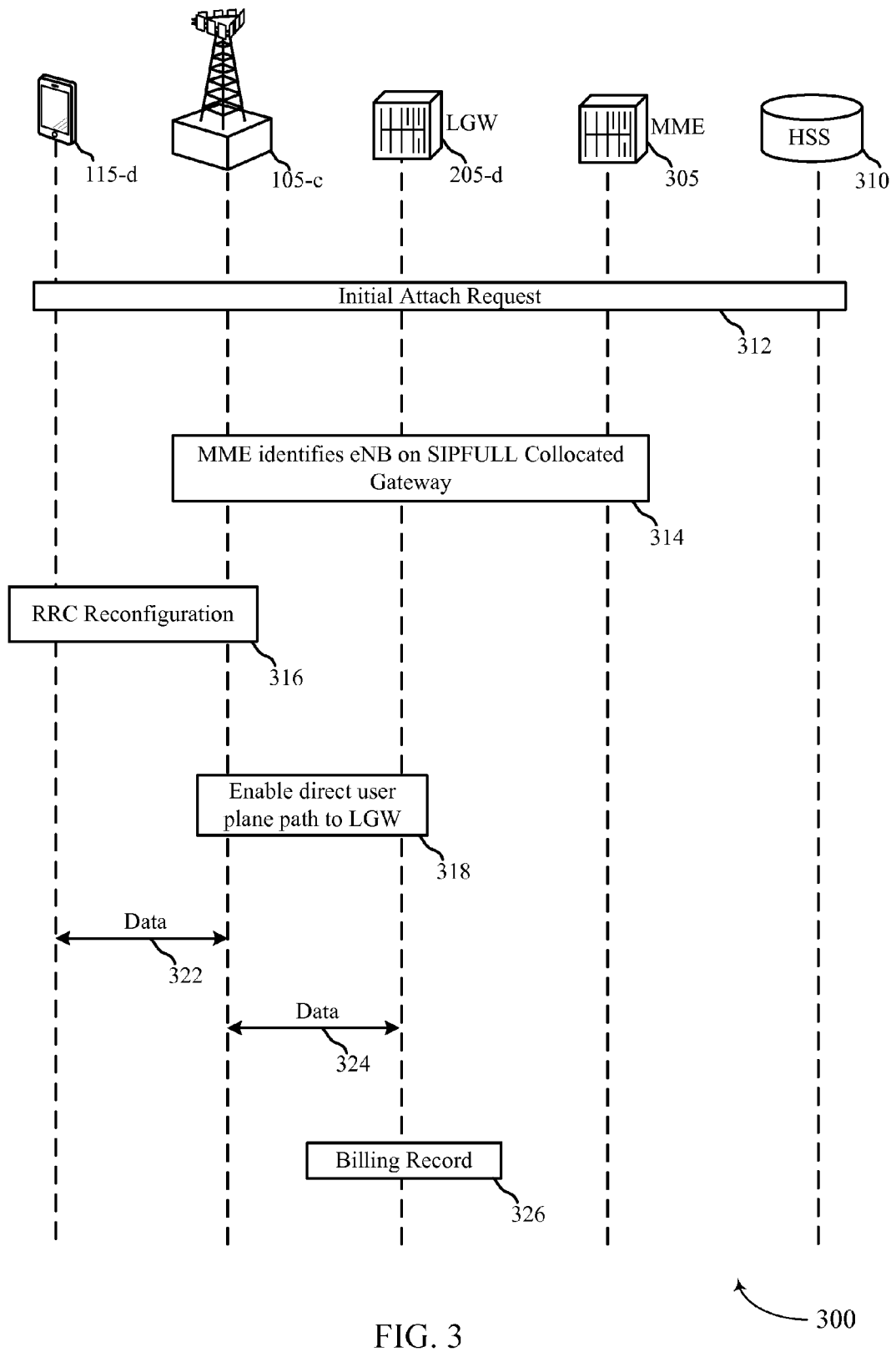
FIG. 3 illustrates an example of a call flow for supporting ultra-low latency in accordance with various aspects of the present disclosure.

Irrespective of the location of an LGW 205, however, SIPFULL may be enabled and the LGW 205 selected on a per APN basis, as described below with reference to FIG. 3. For example, The network entity may enable a low latency IP packet routing (e.g., SIPFULL) for an APN of the UE 115-a based on the latency mode, and the network entity may select an LGW for low latency IP packet routing based on the APN. In some cases, the network entity may determine a QoS for each bearer configured for the UE 115 and select the LGW based on the determined QoS.

Additionally or alternatively, traffic may be routed within a common base station 105. For instance, traffic between UEs 115-a and 115-b may be routed within base station 105-a. For example, UE 115-a may request to establish communication with peer UE 115-b served by a common base station 105-a. For instance, a network entity, such as base station 105-a, LGW 205, or an entity within the EPC 130-a may determine that UEs 115-a and 115-b are connected to a common base station 105-a. The network entity may also determine that UEs 115-a and 115-b have the same latency mode (e.g., both have SIPFULL enabled), and it may thus route packet data traffic between UEs 115-a and 115-b with the base station 105-a.

In some examples, UE 115-a may determine that it is connected to a common base station with UE 115-b. UE 115-a may thus transmit an intra-base station communication request to base station 105-a, or to the EPC 130-a via the base station 105-a. The UE 115-a may then communicate with UE 115-b, which may be upon receiving authorization for intra-base station communication.

In other examples, traffic between UEs 115 may be routed between base stations 105 without passing through the EPC 130-a. For instance, traffic between UE 115-a and 115-c may be routed via the X2 interface between base stations 105-a and 105-b. A network entity, as described above, may determine that UEs 115-a and 115-c are connected to base stations 105-a and 105-b, respectively. The network entity may also determine that UEs 115-a and 115-c have the same latency mode, and it may thus route packet data traffic between the UEs 115-a and 115-c via the X2 interface between base stations 105-a and 105-b, or traffic may be routed between LGWs 205-a and 205-b.

In still further examples, traffic between UEs 115 may be routed via SGW 210 without passing through the PGW 215. So, for example, traffic between UEs 115-b and 115-c may be routed via base stations 105-a and 105-b, and SGW 210 via 51 interfaces. A network entity may thus, as described above, determine that UEs 115-b and 115-c are connected to a common SGW. The network entity may also determine that UEs 115-b and 115-c have the same latency mode, and it may thus route packet data traffic between the UEs 115-a and 115-c via SGW 210, or traffic may be routed between LGWs 205-a and 205-b. The routing between UEs 115 may be executed at the packet data convergence protocol (PDCP)

layer, or at a lower layer. In some cases, the network entity may receive packets routed between the UEs 115-*a* and 115-*c* from the SGW.

In some examples, content caching, e.g., near the edge of the EPC 130-*a*, may be employed to help reduce latency for content delivery. For example, LGWs 205, SGW 210, or PGW 215 may include a local server for cached content. In other examples, a stand-alone content server (not shown) may be included within the EPC 130-*b*. Popular or frequently accessed content may be stored at these servers. For instance, a network operator may build a cache at these servers based on requests from a number of UEs 115. Accordingly, in some examples, when a user, via a UE 115, performs domain name system (DNS) look up for content (e.g., videos), the DNS may direct the UE 115 to the cache at a local server of a network entity. This may further help reduce latency by avoiding backhaul transmissions and processing delay and may be employed with SIPFULL procedures discussed above.

Various SIPFULL procedures that may implemented within the systems 200 are described with reference to FIGS. 3-4B. FIG. 3 illustrates an example of a call flow 300 for supporting ultra-low latency in accordance with various aspects of the present disclosure. The call flow 300 may include a UE 115-*d*, which may be an example of a UE 115 described above with reference to FIGS. 1-2. The communication diagram 300 may also include a base station 105-*c*, which may be an example of a base station 105 described above with reference to FIGS. 1-2. FIG. 3 may further include a LGW 205-*d*, MME 305 and HSS 310, which may each be examples of the LGWs 205, MMEs 135, or HSS 140 described with reference to FIGS. 1-2C. The LGW 205-*d* may be various located as described with reference to FIGS. 2A-2C.

The UE 115-*d* may make an initial attach request 312 with MME 305. The initial attach request 312 may optionally identify APN for which SIPFULL may be permitted for UE 115-*d*. In some examples, the UE 115-*d* may indicate a SIPFULL request in the initial attach request 312. Additionally or alternatively, the UE 115-*d* may identify the QoS requirements associated with the SIPFULL request in the initial attach request 312. The MME 305 may receive the request from the UE 115-*d* and verify whether the UE 115-*d* is permitted to use SIPFULL for the requested PDN connection with the APN based on subscription information for the UE 115-*d*. In some instances, the MME 305 may perform per flow based authorization for SIPFULL associated with the QoS requirements received from the UE 115-*d*. The MME 305 may receive the subscription information for the UE 115-*d* from, for example, HSS 310 to verify whether the requested PDN connection with the APN is permitted.

The MME 305, based on the subscription information obtained from HSS 310, may indicate whether the traffic associated with the APN or other APNs may be allowed or prohibited. In the event that the MME 305 determines that the UE 115-*d* is authorized to utilize SIPFULL for the associated APN, the MME 305 may indicate 314 to the base station 105-*c* that SIPFULL collocated LGW 205-*d* should be established for the UE 115-*d*. Additionally or alternatively, MME 305 may select a standalone LGW 205-*d* for SIPFULL PDN connection establishment. In response, the base station 105-*c* may transmit an RRC connection reconfiguration message 316 to the UE 115-*d*. The RRC connection reconfiguration message 316 may configure the UE 115-*d* for the new PDN connection, utilizing SIPFULL, by establishing the radio bearer with the UE 115-*d*. Subsequently, the base station 105-*c* may enable direct user plane path 318 to LGW 205-*d* for UE 115-*d*. The UE 115-*d* may transmit and receive data via the base station 105-*c* and LGW 205-*d* via data links 322 and 324. In some examples, the SIPFULL services may be associated with an elevated cost to the user, and thus the local gateway 205-*d* may create a charging record 326 based on the amount data offloaded utilizing the SIPFULL services.

Figure 4A:
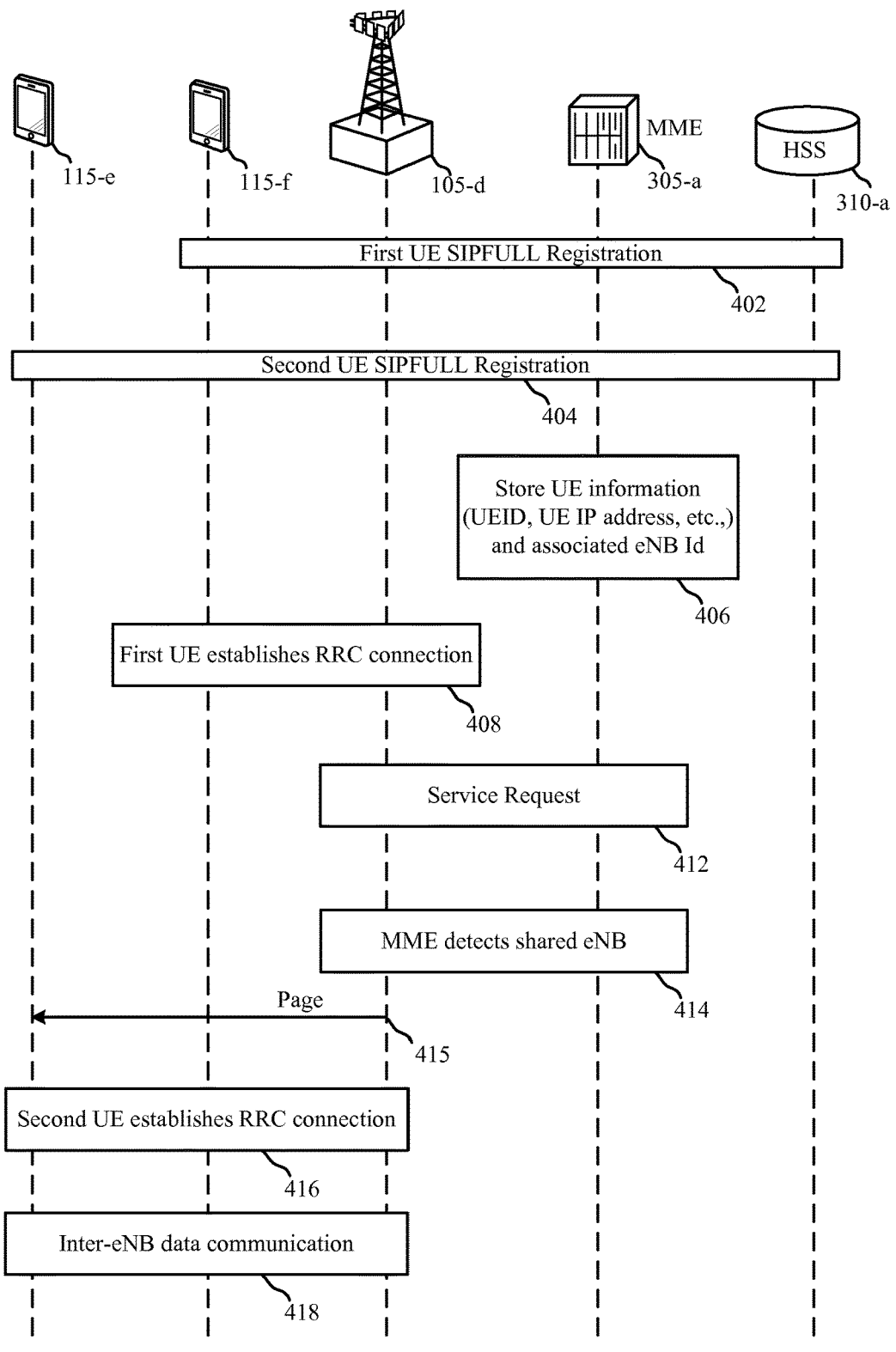
FIGS. 4A-4B illustrate examples of call flow for supporting ultra-low latency in accordance with various aspects of the present disclosure.
Figure 4B:
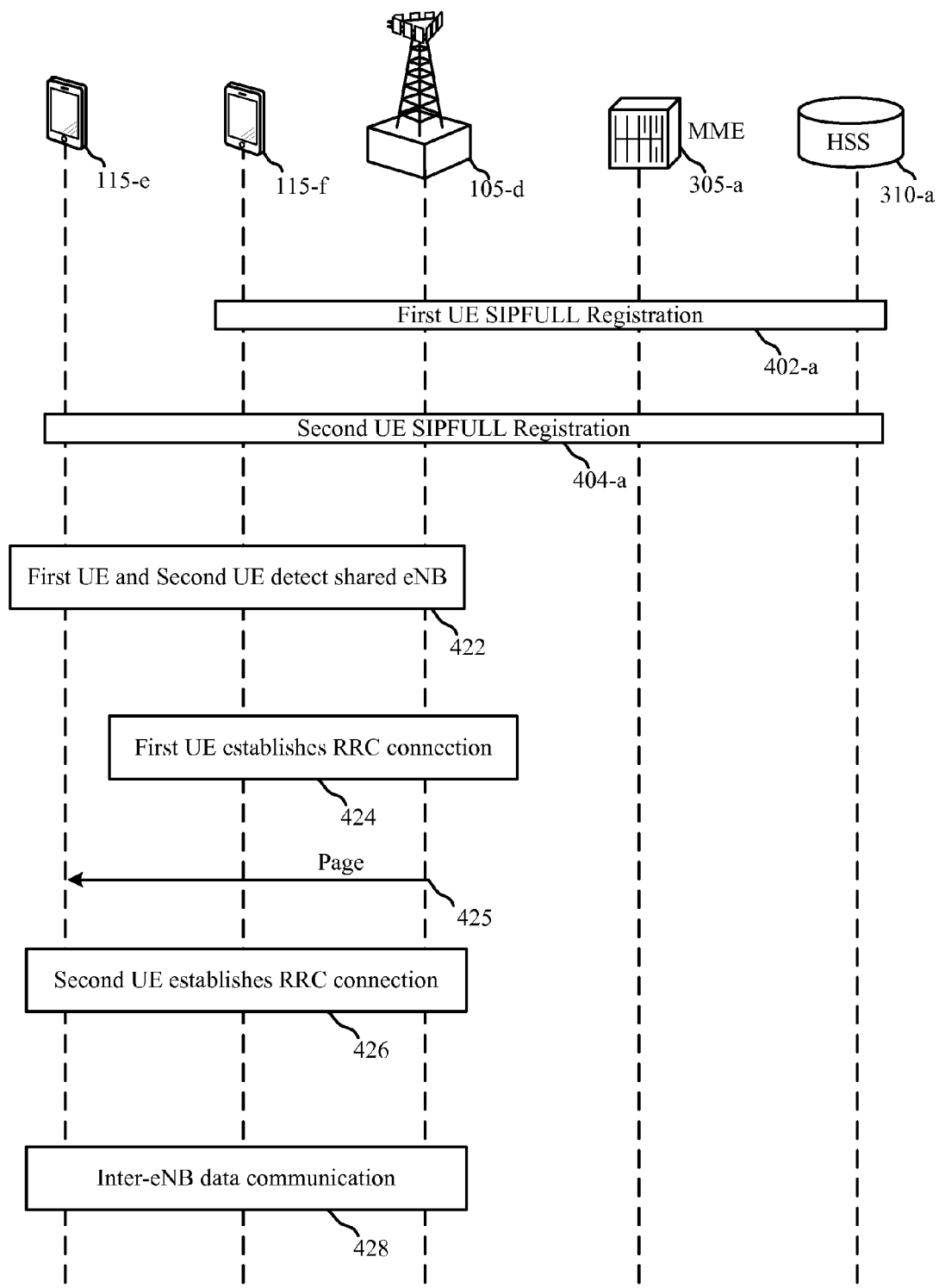

FIG. 4A and FIG. 4B illustrate an examples of call flow 400 for supporting ultra-low latency in accordance with various aspects of the present disclosure. The example of FIG. 4A may include UEs 115-*e* and 115-*f* and base station 105-*d*, which may be examples of the UEs 115 and base stations 105 described above with reference to FIGS. 1-3. The call flow 400-*a* may also include MME 305-*a* and HSS 310-*a*, which may each be examples of the MMEs 135 or 305, or HSS 140 or 310 described with reference to FIGS. 1-2C.

The first UE (e.g., UE 115-*f*) may transmit a registration message 402, which may include a latency mode, to the MME 305-*a* to obtain authorization for or to enable SIPFULL. In some examples, the registration request may be associated with APN. Based on the subscriber information obtained from the HSS 310-*a*, the MME 305-*a* may either permit or deny the UE 115-*f* request for SIPFULL. In the event that MME 305-*a* authorizes the registration request, the MME 305-*a* may notify the base station 105-*d* of the authorization.

The second UE (e.g., 115-*e*) may also transmit a registration request 404 to the MME 305-*a* to obtain SIPFULL functionality. Based on the authorization of the registration request issued from the second UE 115-*e*, the MME 305-*a* may store information 406 associated with the first and second UEs 115. In some examples, the stored UE information may include first and second UE identifications (UEID), first and second UE IP addresses, and the associated base station 105-*d*.

The first UE (e.g., UE 115-*f*) may establish an RRC connection 408 with the base station 105-*d* indicating intended communication for the second UE (e.g., UE 115-*e*). The base station 105-*d*, upon receiving the RRC connection request 408 and identifying the UE 115-*e* as the intended target, may forward a service request 412 to the MME 305-*a*. In response, the MME 305-*a* may detect 414 that the intended UE 115-*e* shares a common base station 105-*d* with the first UE 115-*f* In some examples, the MME 305-*a* may further determine that both the first UE 115-*f* and the second UE 115-*e* are authorized with SIPFULL functionalities based on the subscriber data associated with each UE 115. Based on the determination, the MME 305-*a* may forward the detected information to the base station 105-*d* to establish intra-base station routing.

Accordingly, the base station 105-*d* may page 415 the second UE 115-*e* to establish a second RRC connection 416 with the base station 105-*d*. The first UE 115-*f* and the second UE 115-*e* may then perform inter-eNB communication 418 via the base station 105-*d* without routing the data to the core network.

The example of FIG. 4B may include UEs 115-*e* and 115-*f* and base station 105-*d*, which may be examples of the UEs 115 and base stations 105 described above with reference to FIGS. 1-3. The call flow 400-*b* may also include MME 305-*a* and HSS 310-*a*, which may each be examples of the MMEs 135 or 305, or HSS 140 or 310 described with reference to FIGS. 1-2C.

The UEs 115 each register their SIPFULL capabilities with the MME 305-*a* in steps 402-*a* and 404-*a* as described above with reference to FIG. 4A. In some examples, the first UE 115-*f* may discover 422 that the second UE 115-*f* is located on a common base station 105-*d*. This discovery may be based on either the first or the second UE 115 transmitting a message to the base station 105-*d* to discover nearby UEs 115 served by the base station 105-*d*. In other examples, the first UE 115-*f* may broadcast or announce its presence over the base station 105-*d* in order to allow the second UE 115-*e* to discover the first UE 115-*d* on base station 105-*d*. As a result, the first UE 115-*f* may establish RRC connection 424 with base station 105-*d* identifying first UE's 115-*f* intention to establish communication with the second UE 115-*e*. In response, the base station 105-*d* may page 425 the second UE 115-*e* and prompt the second UE 115-*e* to establish RRC connection 426 with the base station 105-*d*. Based on the established RRC connection, the first and second UEs 115 may establish inter-eNB communication 428 via the base station 105-*d* without routing data packets through the core network.

FIGS. 5A-5D illustrate examples of call flow 500 for handover to support ultra-low latency in accordance with various aspects of the present disclosure. Similar procedures may also be applied for handover to support SIPTO (Selected IP Traffic Offloading). The examples of FIGS. 5A-5D may include a UE 115-*g*, base stations 105, LGW 205, and PDN 220-*c*, which may be examples of UE 115, base stations 105, LGWs 205, and PDNs 220 described above with reference to FIGS. 1-2C.

Figure 5A:
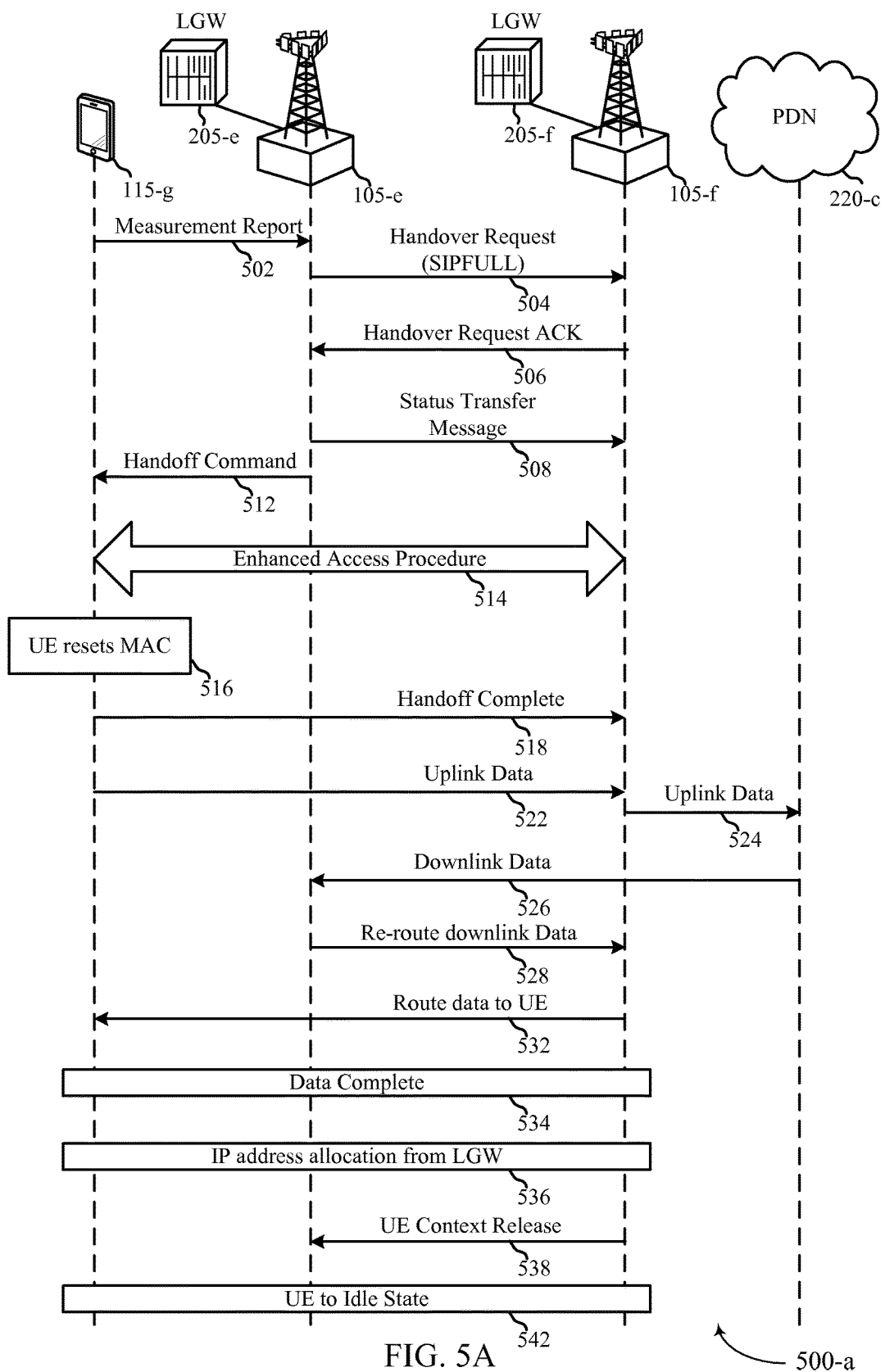
FIGS. 5A-5D illustrate example of call flow for handover to support ultra-low latency in accordance with various aspects of the present disclosure.

In the example of FIG. 5A, UE 115-*g* may maintain an IP address assigned by base station 105-*e* or LGW 205-*e* until a handover to base station 105-*f* is complete. The UE 115-*g* may send a measurement report 502 to the source base station 105-*e*. The measurement report 502 may identify a mobility scenario, which may relate to the signal strength or channel quality between the source base station 105-*e* and the UE 115-*g*. Based on the measurement report 502, the source base station 105-*e* may send a handover request 504 to the target base station 105-*f*. In some examples, sending a handover request 504 comprises a low latency IP routing indication from the source base station 105-*e* to the target base 105-*f*. In other examples, the handover request 504 may include SIPFULL identifier to indicate to the target base station 105-*f* the SIPFULL authorization for UE 115-*g*. Additionally or alternatively, the source base station 105-*e* may select the target base station based in part on a capability of the target base station to support the low latency IP packet routing.

Based on receiving the handover request 504, the target base station 105-*f* may transmit a handover request acknowledgment (ACK) 506 to the source base station 105-*e*. The handover ACK 506 may comprise a low latency IP routing indication from the target base station 105-*f* at the source base station 105-*e*. In some examples, the source base station 105-*e* may transmit a status transfer message 508 to the target base station 105-*f*. The source base station 105-*e* may also issue handoff command 512 to the UE 115-*g* to trigger the handoff from the source base station 105-*e* to the target base station 105-*f*. Enhanced access procedure 514 may thus be implemented between the UE 115-*g* and the target base station 105-*f*. As part of the enhanced access procedure, the UE 115-*g* may initiate RRC reestablishment procedures 516 and transmit a handoff completion message 518 to the target base station 105-*f*.

During the handover, the uplink data 522 from the UE 115-*g* may be routed 524 to the PDN 220-*c* via the target base station 105-*f* directly based on destination IP address and the need to bypass ingress address filtering. However, during this process, the UE 115-*g* may maintain the IP address previously assigned to it by the source local gateway 205-*e*. In some examples, the uplink data 522 may transmitted from the target base station 105-*f* to the source base station 105-*e* prior to being routed 524 to the PDN 220-*c*. Conversely, the downlink data 526 from PDN 220-*c* addressed to UE 115-*g* with previously assigned IP address may be routed to the UE 115-*g* by first traversing through the source base station 105-*e*. The downlink data 526 may then be re-routed 528 to the target base station 105-*f*, prior to being transmitted 532 from the target base station 105-*f* to the UE 115-*g*.

Once the data communication is completed 534, the target base station 105-*f* or LGW 205-*f* may allocate a new or updated IP address to the UE 115-*b*. The target base station 105-*f* may, in some examples, detect the completion of data communication by monitoring the inactivity timer associated with UE 115-*g*. As such, the target base station 105-*f* may indicate to LGW 205-*f* of the data completion and request new IP address for the UE 115-*g* from LGW 205-*f*. Additionally or alternatively, the data completion may be detected by the source base station 105-*e* by monitoring the inactivity time. In some examples, the source base station may indicate to the target base station 105-*f* of the data completion. In other examples, the UE 115-*g* may itself request a new IP address allocation 536 from target local gateway 205-*f* upon completing the pending data communication session. In some examples, the source base station 105-*e* may subsequently receive UE context release 538 and the UE 115-*g* may return to an idle state 542. In some examples, a hysteresis timer may be utilized in order to prevent rapid IP address assignments when the UE 115-*g* moves back and forth between the coverage areas of the source base station 105-*e* and the target base station 105-*f*.

Figure 5B:
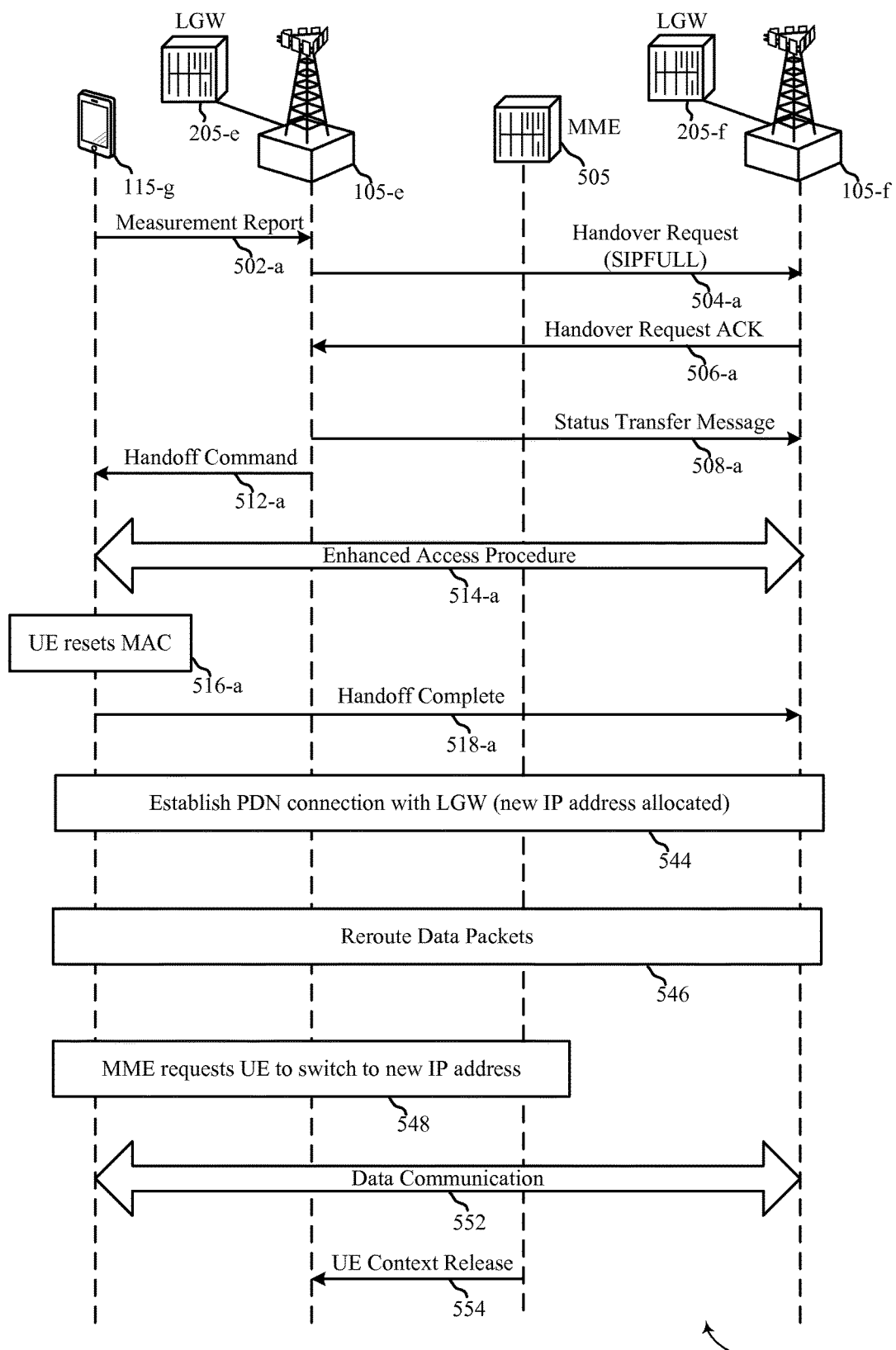

In the example of FIG. 5B, the UE 115-*g* may continue using the IP address assigned by the source local gateway 205-*e* until data communication session is completed. The communications at messages 502-*a* through 518-*a* may be similar to steps 502 through 518 described with reference to FIG. 5A. But the UE 115-*g*, upon transferring the handover complete message 518-*a* to the target base station 105-*f*, may establish a PDN connection 544 with target LGW 205-*f*. As a result, new IP address associated with the target LGW 205-*f* may be assigned to the UE 115-*g*. Despite the allocation of the new IP address, the UE 115-*g* may continue utilizing the previous IP address associated with the source local gateway 205-*e* until completion of data communication session 546.

The UE 115-*g* may receive a message 548 from MME 505 requesting the UE 115-*g* to switch to the new IP address. Additionally or alternatively, the UE 115-*g* may request the MME 505 to switch to the new IP address once its buffered data has been completely transmitted through the previous IP address. Accordingly, the UE 115-*g* may communicate 552 with the target base station 105-*f* utilizing the new IP address associated with the target local gateway 205-*f*. Additionally or alternative, the MME 505 may further transmit a UE contest release command 554 to the source base station 105-*e*.

Figure 5C:
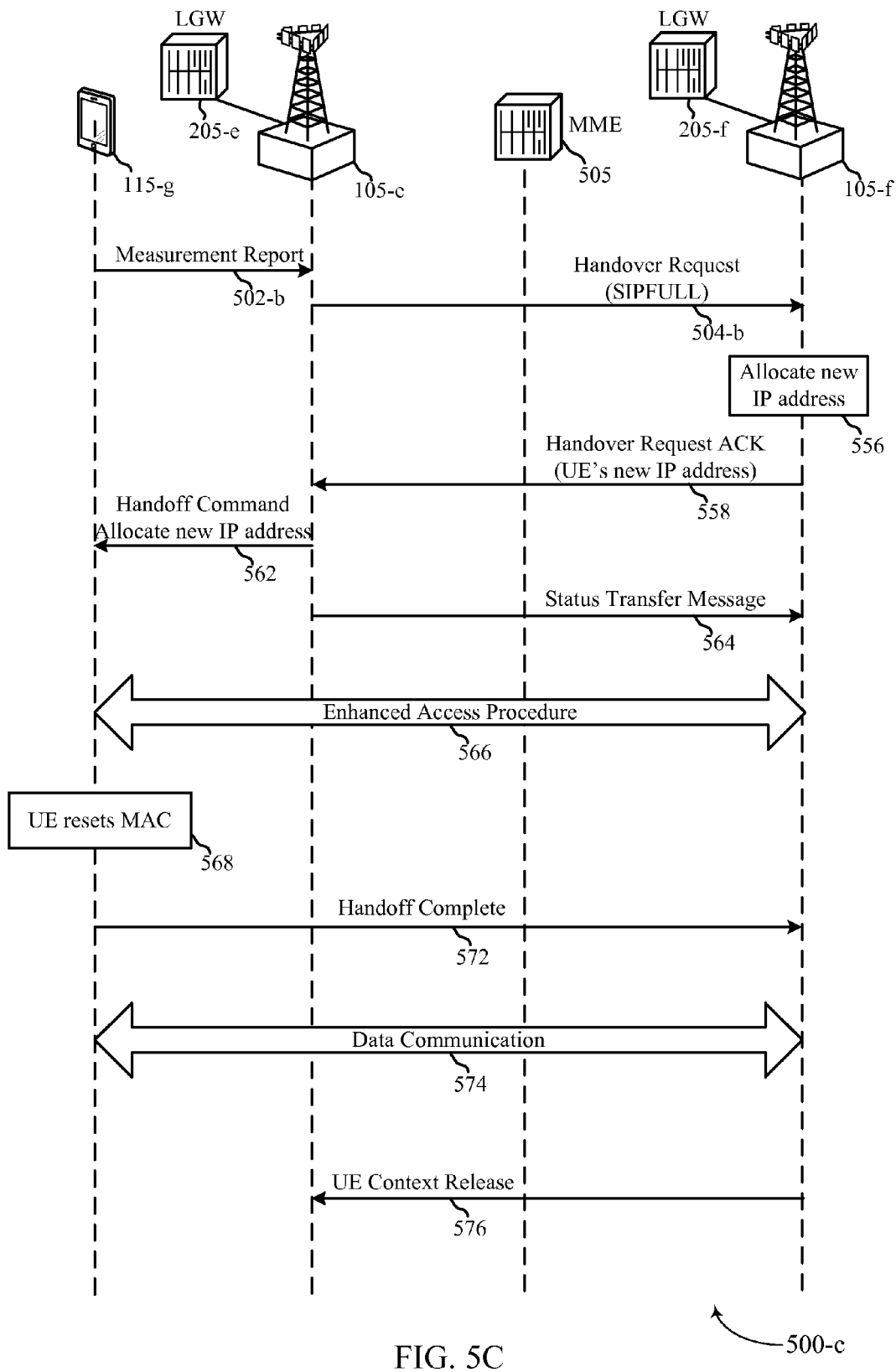

In the example of FIG. 5C, the UE 115-*g* may be assigned a new IP address from the target LGW 205-*f* before initiating a handover procedure. As a result, the UE 115-*g* may immediately switch to the new IP address once handover process is completed. The UE 115-*g* may transmit a measurement report 502-*b* to the source base station 105-*e*. The measurement report 502 may identify a mobility scenario, which may relate to the signal strength or channel quality between the source base station 105-*e* and the UE 115-*g*. In some examples, the reception of the measurement report 502 may trigger the handover. Based on the measurement report 502, the source base station 105-e may transmit a handover request 504-b to the target base station 105-f.

The target base station 105-f may receive a new IP address from the target local gateway 205-f for the UE 115-g. Accordingly, the target base station 105-f may allocate the new IP address 556 and transmit a handover request ACK message 558 to the source base station 105-e. The handover request ACK message may include, for example, the newly allocated IP address for the UE 115-g. In response, the source base station 105-e may transmit a handover command 562 to the UE 115-g that may further comprise the newly allocated IP address. In one example, the source base station 105-e may transmit a status transfer message 564 to the target base station 105-f.

Following the allocation of the new IP address, the UE 115-g may initiate enhanced access procedure 566 and initial RRC reestablishment procedures 568. In some examples, the UE 115-g may transmit a handover (or handoff) complete command 572 to the target base station 105-f, and subsequently establish data communication 574 with the target base station 105-f utilizing the newly assigned IP address received from the target LGW 205-E As discussed above, in some examples, the target base station 105-f may issue a UE context release command 576 to the source base station 105-e.

Figure 5D:
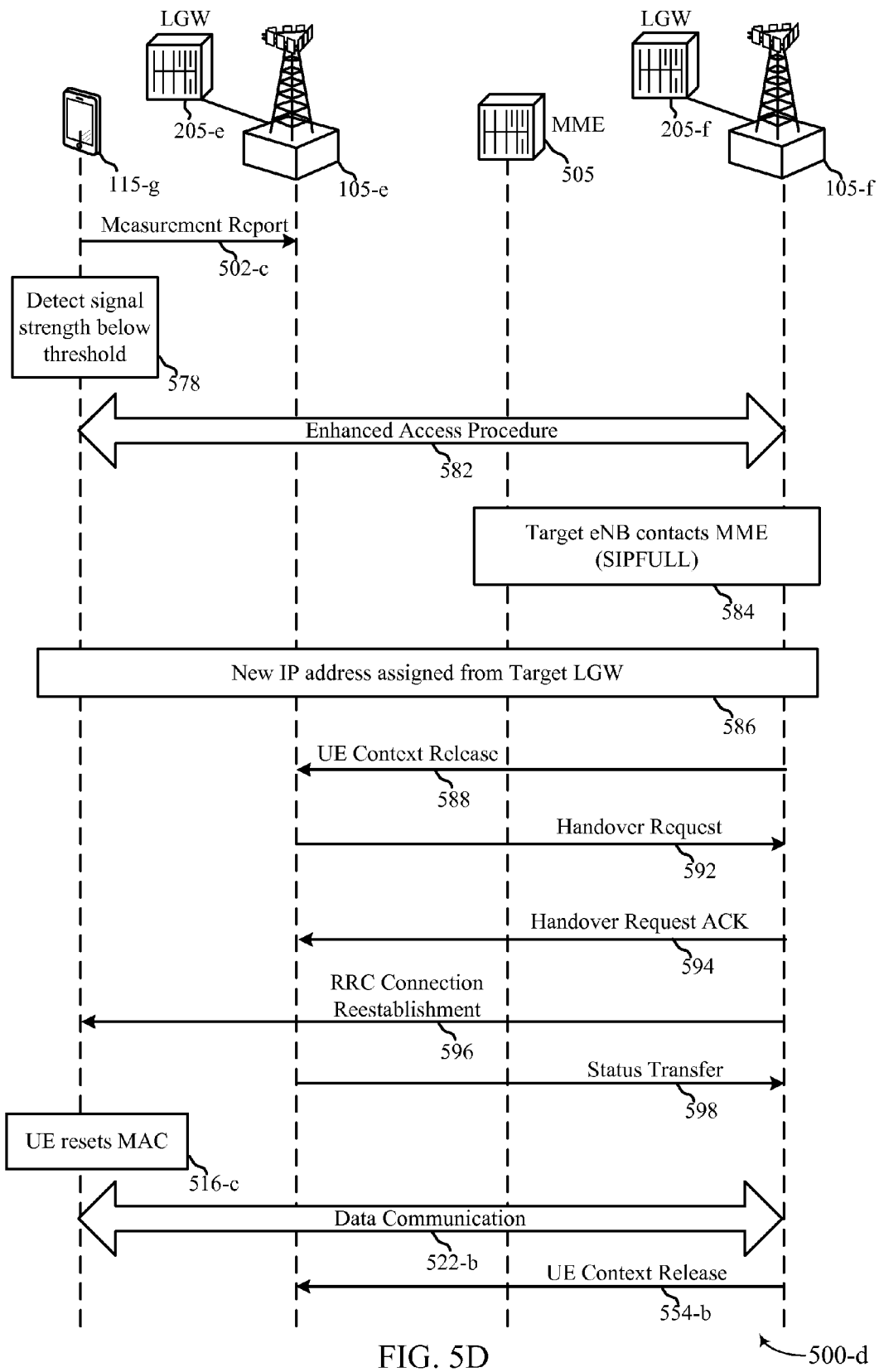

Next, in the example of FIG. 5D, the UE 115-g may complete a handover before connection with the source base station 105-e is lost. The UE 115-g may transmit a measurement report 502-c to the source base station 105-e. The UE 115-g may then determine that the signal strength between the source base station 105-e and the UE 115-g is below a preconfigured threshold 578. In some examples, the network may identify and send to the UE 115-g, the threshold limits through RRC signaling. Based on the detected signal quality, the UE 115-g may initiate enhanced access procedure 582 with the target base station 105-f. The enhanced access procedure 582 may include SIPFULL capabilities of the UE 115-g. In accordance with the present disclosure, the target base station 105-f may contact the MME 505 to verify the SIPFULL capabilities 584 of the UE 115-g.

In some examples of the present disclosure, the target base station 105-f, upon receiving authentication from the MME 505, may request a new IP address for the UE 115-g from the target LGW 205-f The target base station 105-f may transmit the allocated IP address 586 to the UE 115-g. The target base station 105-f may also transmit a UE context release command 588 to the source base station 105-e. The source base station 105-e, based in part on the received UE context release 588, may transmit a handover request 592 to the target base station 592. In some examples, the target base station 105-f may respond to the handover request 592 with a handover request ACK message 594. Successively, the target base station 105-f may also issue a RRC connection reestablishment message 596 to the UE 115-g from which the UE 115-g may initiate RRC reestablishment procedure 516-c. In one or more examples, the source base station 105-e may transmit a status transfer message 598 to the target base station 105-f.

The UE 115-g may thus establish a data communication 522-b with the target base station 105-f utilizing the IP address allocated by the target base station 105-f In some examples, the target base station 105-f may transmit a UE context release 554-b message to the source base station 105-e upon establishment of data communication with the UE 115-g. When the IP address of the UE 115-g is changed, the socket (e.g., TCP socket) may, in some cases, be closed immediately, and thus result in loss of data in the pipeline. In order to mitigate the loss of data, the present disclosure may allow for both IP addresses (i.e., previous IP address and the new IP address) to remain active during the handover. In some examples, the UE 115-g may switch to the new IP address when the buffered data transmitted through the previous IP address. Alternatively, the UE 115-g may utilize the previous IP address until pending data transmission is completed. In such cases, the network may assign the new IP address prior to the UE 115-g entering the idle state. As a result, the socket associated with the previous IP address may be closed and a new socket associated with the new IP address may open.

Figure 6:
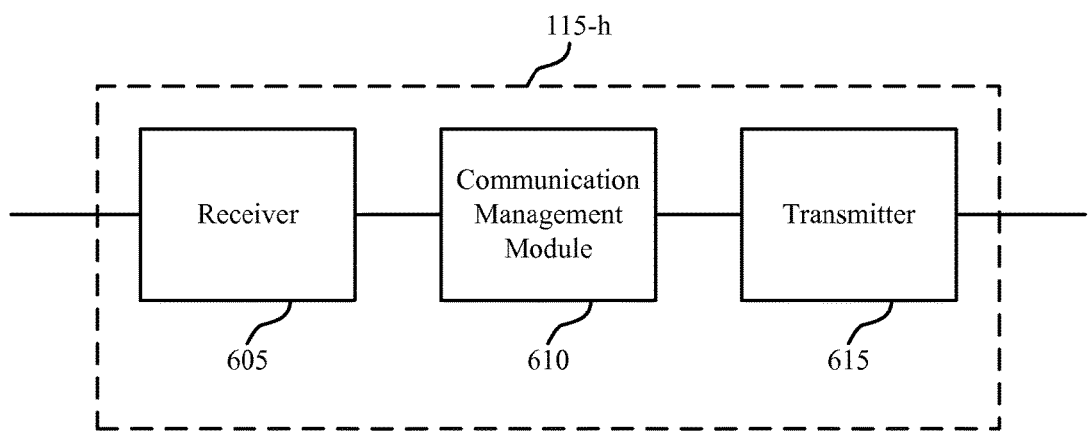
FIG. 6 shows a block diagram of a user equipment (UE) in accordance with various aspects of the present disclosure.

FIG. 6 shows a block diagram 600 of a UE 115-h configured for selected IP flow ultra low latency in accordance with various aspects of the present disclosure. UE 115-h may be an example of aspects of a UE 115 described with reference to FIGS. 1-5. UE 115-h may include a receiver 605, a communication management module 610, or a transmitter 615. UE 115-h may also include a processor. Each of these components may be in communication with one another.

The receiver 605 may receive information such as packets, user data, or control information associated with various information channels (e.g., control channels, data channels, and information related to selected IP flow ultra low latency, etc.). Information may be passed on to the communication management module 610, and to other components of UE 115-h. In some examples, the receiver 605 may receive downlink data from a target base station utilizing the IP address allocated by a source LGW, where the downlink data is routed via the source base station. The receiver 605 may also receive downlink data from the target base station utilizing the IP address allocated by the source LGW, where the downlink data is routed via the source base station. In some examples, the receiver 605 may receive data at the source base station.

The communication management module 610 may transmit a latency mode signal to a network, receive an authorization signal for low latency IP packet routing based at least in part on the latency mode signal, and route packets in accordance with the authorization signal via a local gateway (LGW) based at least in part on the authorization signal. In some cases, the low latency IP packet routing is authorized for an APN based on the latency mode signal or subscriber information or both. In some examples, the latency mode signal is a request for SIPFULL authorization or enablement. Additionally or alternatively, the latency mode signal may be an indication that the UE 115-h is capable of operating in a low latency mode.

The transmitter 615 may transmit signals received from other components of UE 115-h. In some examples, the transmitter 615 may be collocated with the receiver 605 in a transceiver module. The transmitter 615 may include a single antenna, or it may include a several antennas. In some examples, the transmitter 615 may transmit uplink data to the target base station utilizing an IP address allocated by the source LGW. In some examples, the transmitter 615 may transmit uplink data to the target base station utilizing an IP address allocated by the source LGW. In other examples, the transmitter 615 may communicate with the target base station utilizing the new IP address allocated form the target LGW.

Figure 7:
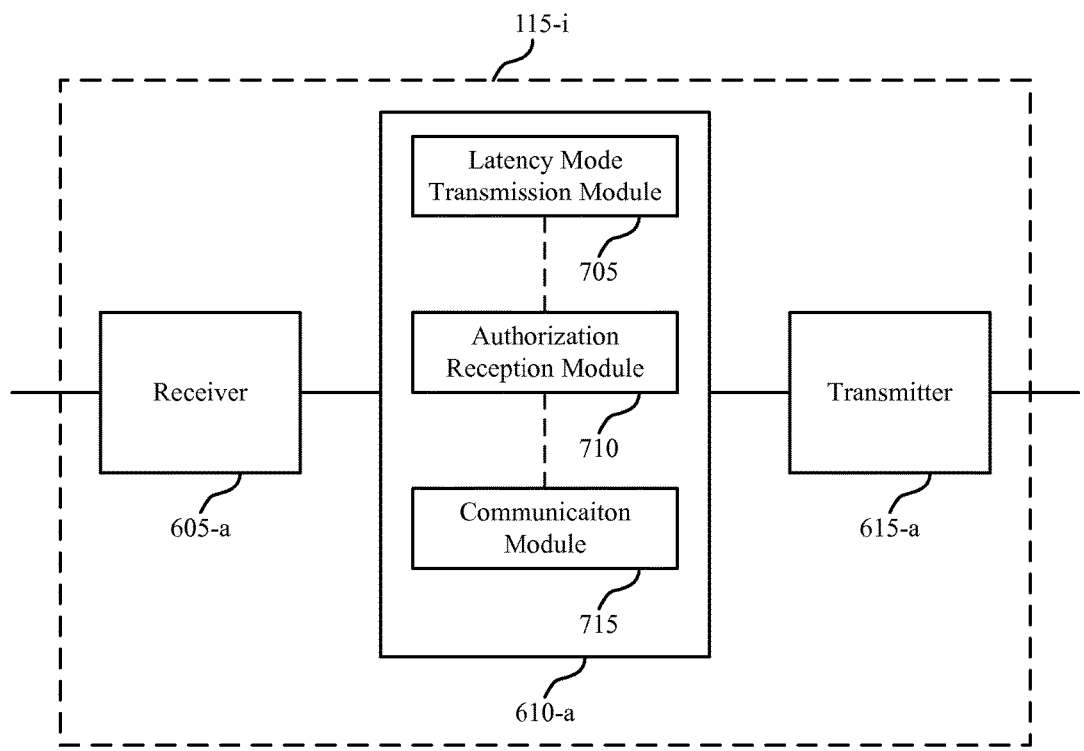
FIG. 7 shows a block diagram of a UE in accordance with various aspects of the present disclosure.

FIG. 7 shows a block diagram 700 of a UE 115-i for selected IP flow ultra low latency in accordance with various aspects of the present disclosure. UE 115-*i* may be an example of aspects of a UE 115 described with reference to FIGS. 1-6. UE 115-*i* may include a receiver 605-*a*, a communication management module 610-*a*, or a transmitter 615-*a*. UE 115-*i* may also include a processor. Each of these components may be in communication with one another. The communication management module 610-*a* may also include a latency mode transmission module 705, an authorization reception module 710, and a communication module 715.

The receiver 605-*a* may receive information which may be passed on to communication management module 610-*a*, and to other components of UE 115-*i*. The communication management module 610-*a* may perform the operations described above with reference to FIG. 6. The transmitter 615-*a* may transmit signals received from other components of UE 115-*i*.

The latency mode transmission module 705 may transmit a latency mode signal to a network as described above with reference to FIGS. 2-5. The latency mode signal may, for instance, be a request for SIPFULL authorization or enablement. The authorization reception module 710 may receive an authorization signal for low latency IP packet routing for an APN based at least in part on the latency mode signal, subscriber information, or both, as described above with reference to FIGS. 2-5. The communication module 715 may route packets in accordance with the authorization signal via LGW based at least in part on the authorization signal as described above with reference to FIGS. 2-5.

Figure 8:
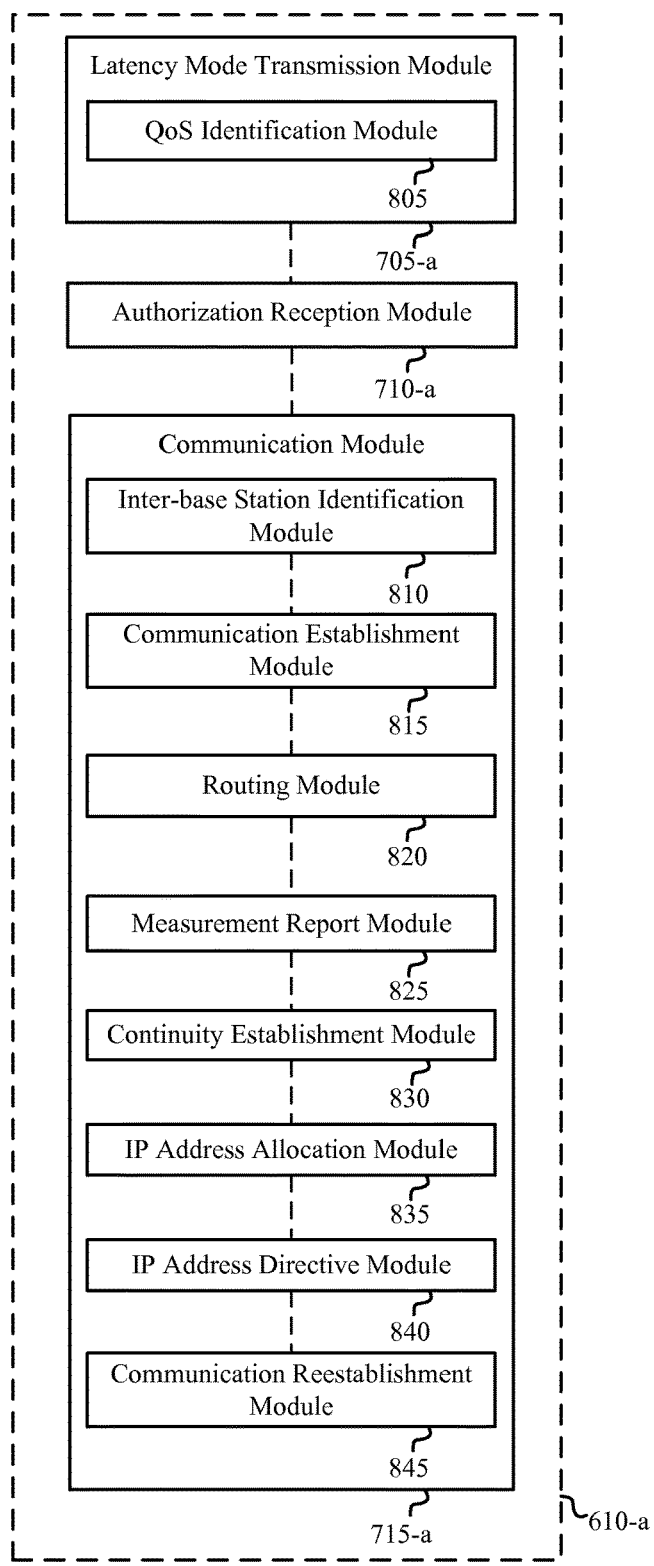
FIG. 8 shows a block diagram of a communication management module in accordance with various aspects of the present disclosure.

FIG. 8 shows a block diagram 800 of a communication management module 610-*b* for selected IP flow ultra low latency in accordance with various aspects of the present disclosure. The communication management module 610-*b* may be an example of aspects of a communication management module 610 described with reference to FIGS. 6-7. The communication management module 610-*b* may include a latency mode transmission module 705-*a*, an authorization reception module 710-*a*, and a communication module 715-*a*. Each of these modules may perform the functions described above with reference to FIG. 7. The communication management module 610-*b* may also include a QoS identification module 805, an inter-base station identification module 810, a communication establishment module 815, a routing module 820, a measurement report module 825, a continuity establishment module 830, an IP address allocation module 835, an IP address directive module 840, and a communication reestablishment module 845.

The QoS identification module 805 may transmit a QoS indication to the network, wherein the authorization signal is based at least in part on the QoS indication as described above with reference to FIGS. 2-5. The inter-base station identification module 810 may determine that a UE is connected to a common base station as described above with reference to FIGS. 2-5. The communication establishment module 815 may transmit an intra-base station communication request to the network as described above with reference to FIGS. 2-5.

The routing module 820 may communicate with the UE via the common base station, wherein packet data traffic with the UE is routed within the common base station as described above with reference to FIGS. 2-5. The routing module 820 may also communicate with the target base station utilizing the new IP address allocated from the target LGW.

The measurement report module 825 may transmit a measurement report to a source base station as described above with reference to FIGS. 2-5. The continuity establishment module 830 may maintain service continuity during a handover initiated based at least in part on the measurement report as described above with reference to FIGS. 2-5.

The IP address allocation module 835 may receive a new IP address allocation from a target LGW associated with the target base station as described above with reference to FIGS. 2-5. The IP address allocation module 835 may also receive a new IP address allocation from a target LGW associated with the target base station. The IP address allocation module 835 may also receive a new IP address allocated from a target LGW associated with the target base station. The IP address allocation module 835 may also receive, from an MME, a new IP address allocated from a target LGW associated with the target base station.

The IP address directive module 840 may receive an indication from a MME to utilize the new IP address as described above with reference to FIGS. 2-5. The communication reestablishment module 845 may reestablish a RRC connection with the target base station as described above with reference to FIGS. 2-5. The communication reestablishment module 845 may also reestablish a radio resource control (RRC) connection with the target base station.

The components of UE 115-*h*, UE 115-*i*, or communication management module 610-*b* may, individually or collectively, be implemented with at least one application specific integrated circuit (ASIC) adapted to perform some or all of the applicable functions in hardware. Alternatively, the functions may be performed by one or more other processing units (or cores), on at least one integrated circuit (IC). In other embodiments, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 9:
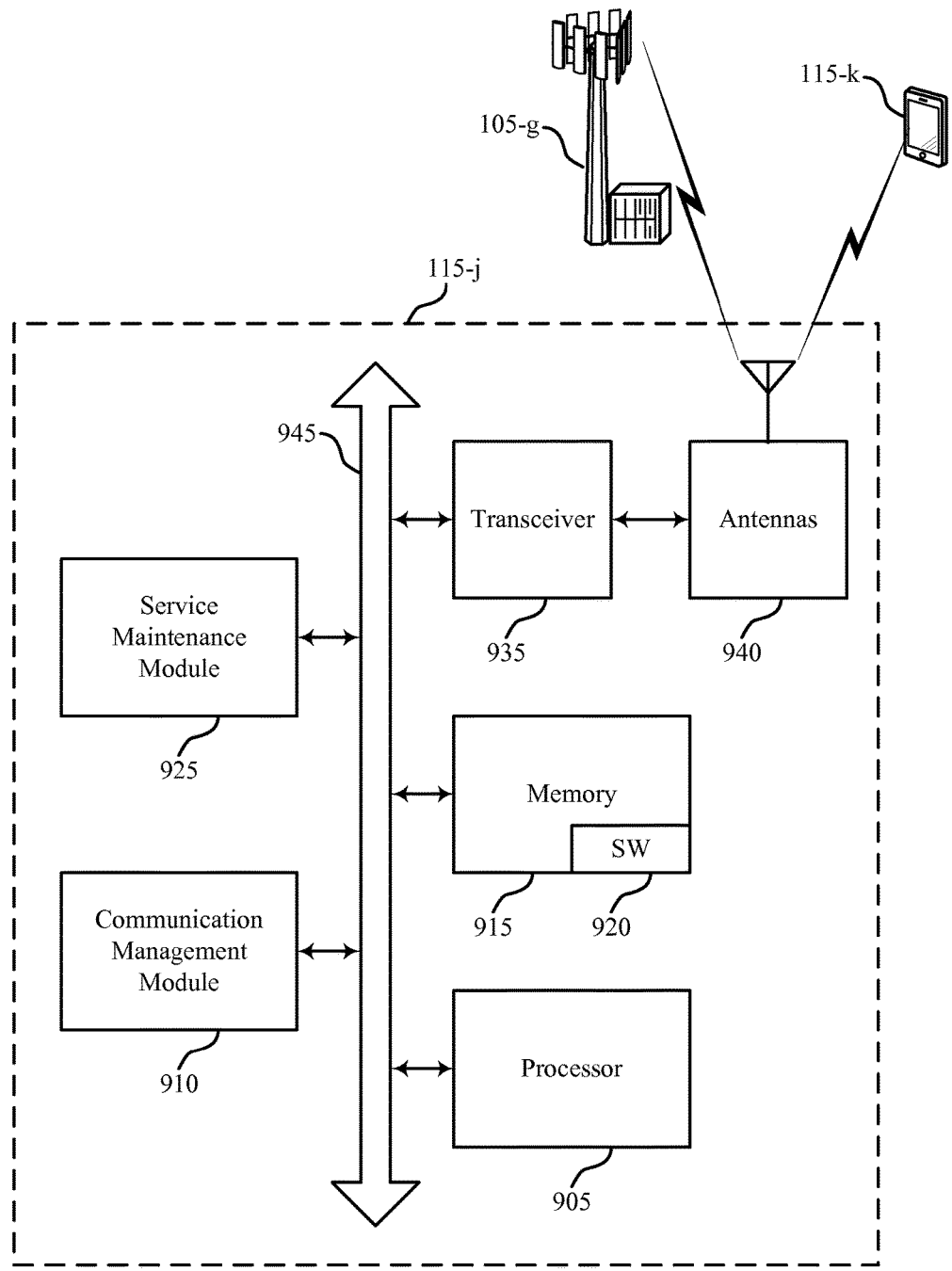
FIG. 9 illustrates a block diagram of a system including a UE in accordance with various aspects of the present disclosure.

FIG. 9 shows a diagram of a system 900 including a UE 115 configured for selected IP flow ultra low latency in accordance with various aspects of the present disclosure. System 900 may include UE 115-*j*, which may be an example of a UE 115 described above with reference to FIGS. 1-8. UE 115-*j* may include a communication management module 910, which may be an example of a communication management module 610 described with reference to FIGS. 6-8. UE 115-*j* may also include a service maintenance module 925. UE 115-*j* may also include components for bi-directional voice and data communications including components for transmitting communications and components for receiving communications. For example, UE 115-*j* may communicate bi-directionally with UE 115-*k* or base station 105-*g*.

In some examples, the service maintenance module 925 may receive an indication from a MME to utilize the new IP address as described above with reference to FIGS. 2-5. Additionally or alternatively, the service maintenance module 925 may determine when, during the handover period, the UE 115-*j* should switch from a previously assigned IP address associated with the source local gateway to a newly assigned IP address associated with the target local gateway. In one or more examples, the service maintenance module 925 may assist in maintaining service continuity relating to the low latency IP packet routing during the handover procedure.

UE 115-*j* may also include a processor module 905, and memory 915 (including software (SW) 920), a transceiver module 935, and one or more antenna(s) 940, each of which may communicate, directly or indirectly, with one another (e.g., via buses 945). The transceiver module 935 may communicate bi-directionally, via the antenna(s) 940 or wired or wireless links, with one or more networks, as described above. For example, the transceiver module 935 may communicate bi-directionally with a base station 105 or another UE 115. The transceiver module 935 may include a modem to modulate the packets and provide the modulated packets to the antenna(s) 940 for transmission, and to demodulate packets received from the antenna(s) 940. While UE 115-*j* may include a single antenna 940, UE 115-*j* may also have multiple antennas 940 capable of concurrently transmitting or receiving multiple wireless transmissions.

The memory 915 may include random access memory (RAM) and read only memory (ROM). The memory 915 may store computer-readable, computer-executable software/firmware code 920 including instructions that, when executed, cause the processor module 905 to perform various functions described herein (e.g., selected IP flow ultra low latency, etc.). Alternatively, the software/firmware code 920 may not be directly executable by the processor module 905 but cause a computer (e.g., when compiled and executed) to perform functions described herein. The processor module 905 may include an intelligent hardware device, (e.g., a central processing unit (CPU), a microcontroller, an ASIC, etc.)

Figure 10:
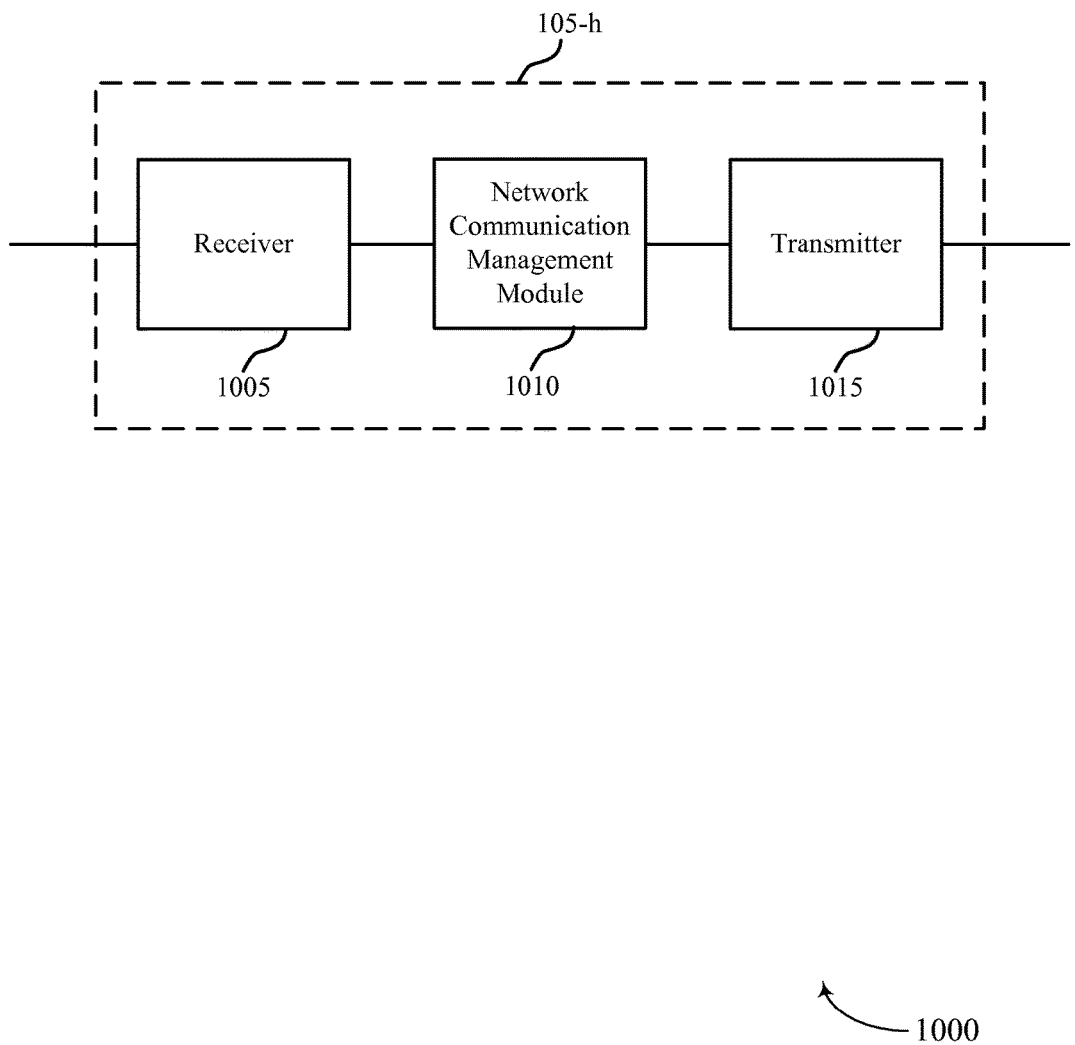
FIG. 10 shows a block diagram of a network entity in accordance with various aspects of the present disclosure.

FIG. 10 shows a block diagram 1000 of a network entity configured for selected IP flow ultra low latency in accordance with various aspects of the present disclosure. The network entity may generally be described in terms of a base station 105-*h*, it should be appreciated that the functionality described with reference to FIG. 10 may be implemented by an LGW, SGW, MME, or the like, as described above. Base station 105-*h*, or network entity, may thus be an example of aspects of a base station 105, LGW 205, SGW 145 or 210, or MME 135 or 305, described with reference to FIGS. 1-9. Base station 105-*h* may include a receiver 1005, a network communication management module 1010, or a transmitter 1015. Base station 105-*h* may also include a processor. Each of these components may be in communication with one another.

The receiver 1005 may receive information such as packets, user data, or control information associated with various information channels (e.g., control channels, data channels, and information related to selected IP flow ultra low latency, etc.). Information may be passed on to the network communication management module 1010, and to other components of base station 105-*h*. In some examples, the receiver 1005 may be an aspect of a source base station and receive downlink data from a target base station utilizing the IP address allocated by a source LGW, wherein the downlink data is routed via the source base station. In some examples, the receiver 1005 may receive downlink data from the target base station utilizing the IP address allocated by the source LGW, wherein the downlink data is routed via the source base station. In some examples, the receiver 1005 may receive data at the source base station.

The network communication management module 1010 may determine a latency mode of a first UE, enable low latency IP packet routing the first UE based at least in part on the latency mode of the first UE, and select a LGW for the low latency IP packet routing based at least in part on the low latency mode of the first UE. In some examples, the low latency IP packet routing may be enabled for an APN associated with the latency mode of the first UE. Additionally, the LGW may be selected based on the APN.

The transmitter 1015 may transmit signals received from other components of base station 105-*h*. In some embodiments, the transmitter 1015 may be collocated with the receiver 1005 in a transceiver module. The transmitter 1015 may include a single antenna, or it may include a number of antennas. In some examples, the transmitter 1015 may be an aspect of a source base station, and it may transmit uplink data to a target base station utilizing an IP address allocated by the source LGW. In some examples, the transmitter 1015 may transmit, as part of a handover procedure, uplink data to the target base station utilizing an IP address allocated by the source LGW. In some examples, the transmitter 1015 may communicate with the target base station utilizing the new IP address allocated form the target LGW.

Figure 11:
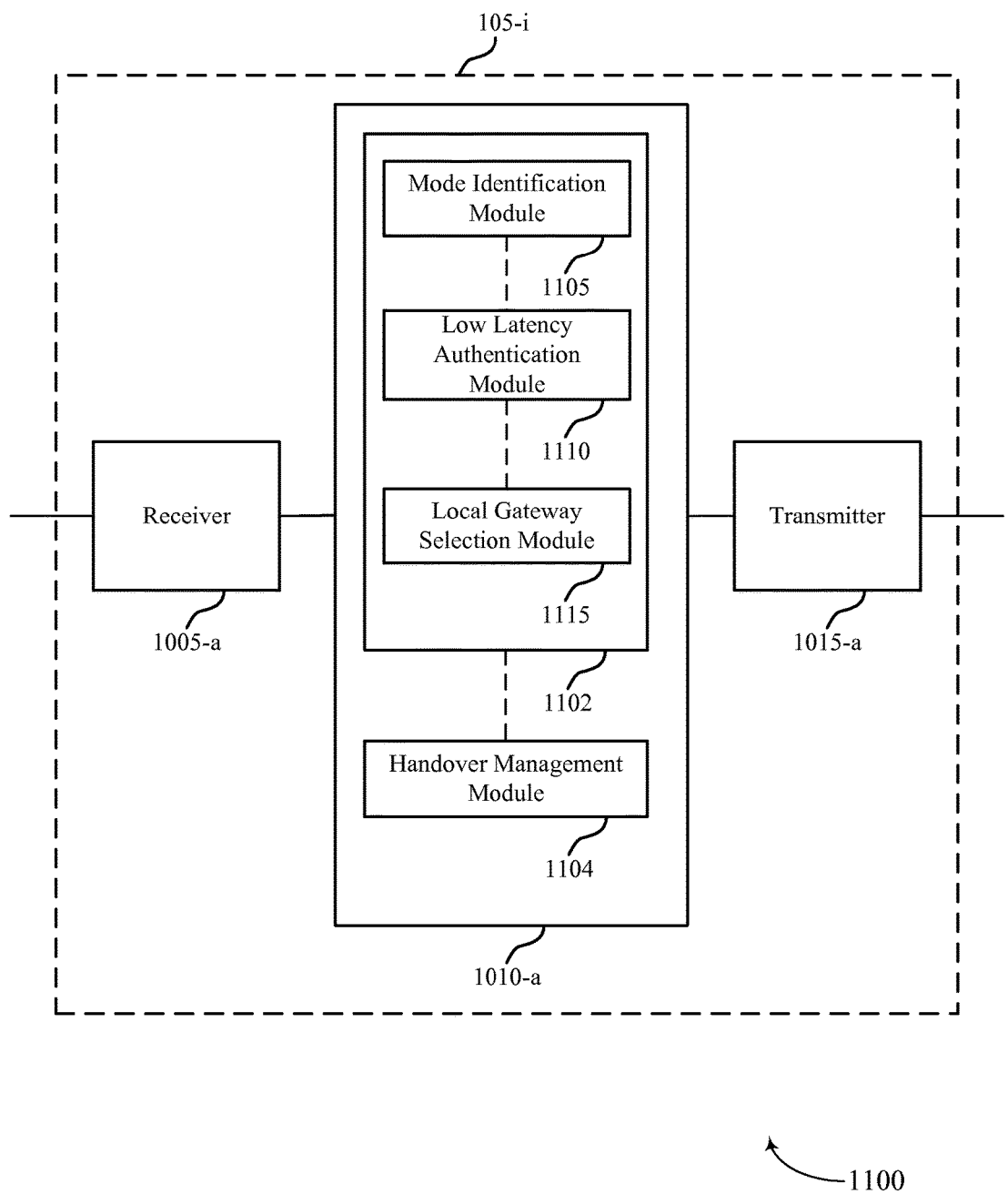
FIG. 11 shows a block diagram of a network entity in accordance with various aspects of the present disclosure.

FIG. 11 shows a block diagram 1100 of a network entity for selected IP flow ultra low latency in accordance with various aspects of the present disclosure. The network entity may generally be described in terms of a base station 105-*i*, which may be an example of aspects of a base station 105 described with reference to FIGS. 1-10. Alternatively, the functionality described with reference base station 105-*i* may be implemented in a network entity other than a base station, such as LGW 205, SGW 145 or 210, or MME 135 or 305 described in the preceding figures. Base station 105-*i* may include a receiver 1005-*a*, a network communication management module 1010-*a*, or a transmitter 1015-*a*. The network communication management module 1010-*a* may include a low latency management module 1102 and handover management module 1104. Base Station 105-*i* may also include a processor. Each of these components may be in communication with one another. The low latency management module 1102 may include a mode identification module 1105, a low latency authentication module 1110, and a local gateway selection module 1115.

The receiver 1005-*a* may receive information which may be passed on to the network communication management module 1010-*a*, and to other components of base station 105-*i*. The network communication management module 1010-*a* may perform the operations described above with reference to FIG. 10. The low latency module 1102, and its various submodules, may manage SIPFULL operations. The handover management module 1104 may manage or implement handover operations of, for example, SIPFULL authorized UEs. The transmitter 1015-*a* may transmit signals received from other components of base station 105-*i*.

The mode identification module 1105 may determine a latency mode of a first UE as described above with reference to FIGS. 2-5. For example, the mode identification module 1105 may determine whether a UE is capable of or authorized for SIPFULL. The low latency authentication module 1110 may enable low latency IP packet routing for the first UE based at least in part on the latency mode of the first UE as described above with reference to FIGS. 2-5. In some cases, the low latency IP packet routing may be enabled for an APN associated with the latency mode of the first UE.

The local gateway selection module 1115 may select a local gateway (LGW) for the low latency IP packet routing based on the low latency mode of the first UE as described above with reference to FIGS. 2-5. In some cases, the LGW may be selected based on the APN. The local gateway selection module 1115 may also select the LGW based on a determined QoS. In some examples, the LGW selected by the local gateway selection module 1115 includes a first LGW collocated with the first base station. The local gateway selection module 1115 may also select a second LGW collocated with the second base station.

Figure 12A:
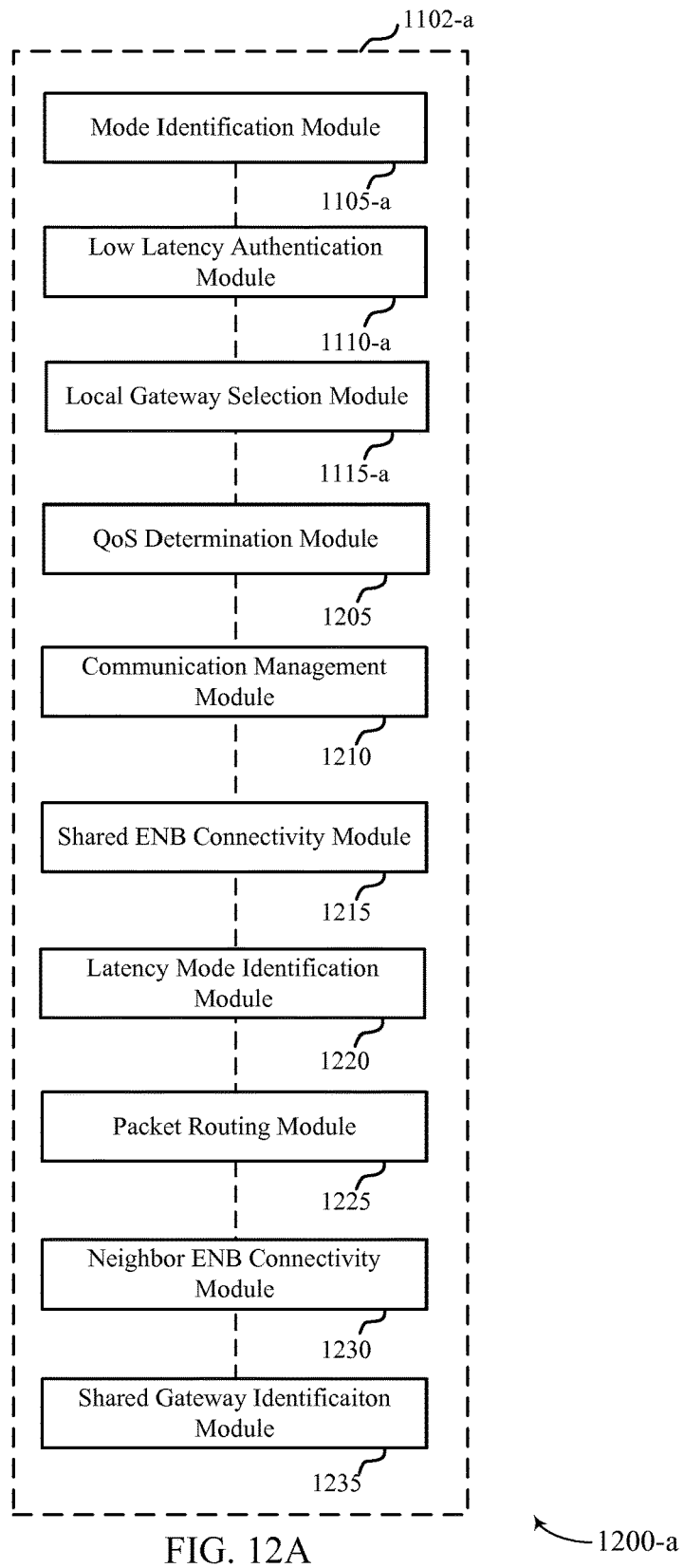
FIG. 12A shows a block diagram of a low latency management module in accordance with various aspects of the present disclosure.

FIG. 12A shows a block diagram 1200-*a* of a low latency management module 1102-*a* for selected IP flow ultra low latency in accordance with various aspects of the present disclosure. The low latency management module 1102-*a* may be an example of aspects of a low latency management module 1102 described with reference to FIG. 11. In some examples, the low latency management module 1102-*a* is a component of a base station 105, as described in the preceding figures. In other examples, the low latency management module 1102-*a* is a component of an MME, such as MME 135 or 305 described in the preceding figures. In still other examples, the low latency management module 1102-*a* may be an example of aspects of an LGW 205 or SGW 145 or 210 described in the preceding figures.

The low latency management module 1102-*a* may include a mode identification module 1105-*a*, a low latency authentication module 1110-*a*, and a local gateway selection module 1115-*a*. Each of these modules may perform the functions described above with reference to FIG. 11. The low latency management module 1102-*a* may also include a QoS determination module 1205, a communication management module 1210, a shared eNB connectivity module 1215, a latency mode identification module 1220, a packet routing module 1225, a neighbor eNB connectivity module 1230, and a shared gateway identification module 1235.

The QoS determination module 1205 may determine a QoS for each bearer configured for the first UE as described above with reference to FIGS. 2-5. The communication management module 1210 may be configured such that the LGW may be collocated with a base station as described above with reference to FIGS. 2-5. In some examples, the LGW may be collocated with an SGW within a core network. The shared eNB connectivity module 1215 may determine that the first UE and a second UE are connected to a common base station as described above with reference to FIGS. 2-5.

The latency mode identification module 1220 may determine that a latency mode of the second UE is the same as the latency mode of the first UE as described above with reference to FIGS. 2-5. The latency mode identification module 1220 may also determine that a latency mode of the second UE is the same as the latency mode of the first UE.

The packet routing module 1225 may route packet data traffic between the first and second UEs within the common base station based at least in part on determining that the latency mode of the second UE is the same as the latency mode of the first UE as described above with reference to FIGS. 2-5. In some examples, the packet data traffic includes IP packet data, and the routing may be via the LGW. The packet data traffic may include packet data, and the routing may be at a packet data convergence protocol (PDCP) or lower layer. In some examples, the LGW may be collocated with a common base station.

Additionally or alternatively, the packet routing module 1225 may route packet data traffic between the first and second UEs over the direct backhaul link between the first and second base stations. In some examples, the packet data traffic includes IP packet data, and the routing may be via the LGW. In some examples, the packet routing module 1225 may route the packet data traffic via the first and second LGWs. The LGW may, for instance, be collocated with a serving gateway (SGW) in a core network, and the routing may be via the LGW. The packet routing module 1225 may, in other examples, route packet data traffic between the first and second UEs within the SGW. In still further examples, the packet routing module 1225 may cache data at an LGW or SGW as described above with reference to FIGS. 2-5. The packet routing module 1225 may, in some examples, receive packets routed between the first and second UEs from the SGW.

The neighbor eNB connectivity module 1230 may determine that the first UE is connected to a first base station and a second UE is connected to a second base station, where the first and second base stations are in communication via a direct backhaul link as described above with reference to FIGS. 2-5. In some examples, the shared gateway identification module 1235 may determine that the first UE and a second UE are connected to a common SGW as described above with reference to FIGS. 2-5.

Figure 12B:
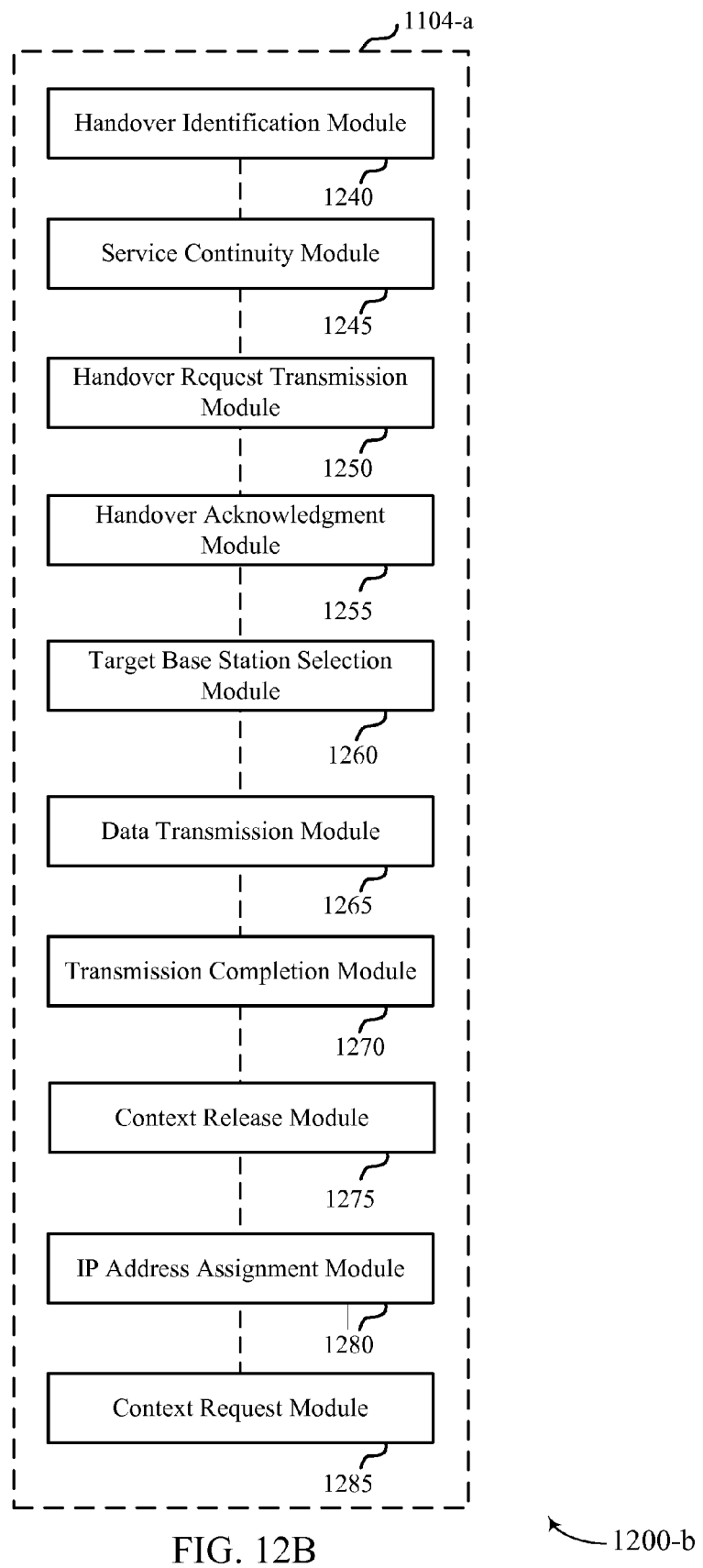
FIG. 12B shows a block diagram of a handover management module in accordance with various aspects of the present disclosure.

FIG. 12B shows a block diagram 1200-*b* of a handover management module 1104-*a* for selected IP flow ultra low latency in accordance with various aspects of the present disclosure. The handover management module 1104-*a* may be an example of aspects of a handover management module 1104 described with reference to FIG. 11. In some examples, the handover management module 1104-*a* is a component of a base station 105, as described in the preceding figures. In other examples, the handover management module 1104-*a* is a component of an MME, such as MME 135 or 305 described in the preceding figures. In still other examples, the handover management module 1104-*a* may be an example of aspects of an LGW 205 or SGW 145 or 210.

The handover management module 1104-*a* may include a handover identification module 1240, a service continuity module 1245, a handover request transmission module 1250, a handover acknowledgment module 1255, a target base station selection module 1260, a data transmission module 1265, a transmission completion module 1270, a context release module 1275, an IP address assignment module 1280, a context request module 1285

The handover identification module 1240 may identify a handover of the first UE from a source base station to a target base station as described above with reference to FIGS. 2-5. The service continuity module 1245 may assist in maintaining service continuity relating to the low latency IP packet routing during the handover as described above with reference to FIGS. 2-5. The handover request transmission module 1250 may send or identify a handover request including, a low latency IP routing indication, from the source base station to the target base station, as described above with reference to FIGS. 2-5. The handover request transmission module 1250 may also send a or identify handover request, which may include a low latency IP routing indication from the source base station to the target base station. In some examples, the handover request transmission module 1250 may send or identify a handover request, in response to the context request, from the source base station to the target base station.

The handover acknowledgment module 1255 may receive or recognize a handover acknowledgment, which may include a low latency IP routing indication, from the target base station at the source base station, as described above with reference to FIGS. 2-5. The handover acknowledgment module 1255 may also receive or recognize a handover acknowledgment that may include the low latency IP routing indication and an IP address from the target base station at the source base station. The handover acknowledgment module 1255 may, in some examples, receive or recognize a handover acknowledgment, in response to the handover request, at the source base station from the target base station.

The target base station selection module 1260 may select the target base station, with or for the source base station, based on a capability of the target base station to support the low latency IP packet routing as described above with reference to FIGS. 2-5. The data transmission module 1265 may transmit the data to the first UE via the target base station using an IP address allocated by the LGW as described above with reference to FIGS. 2-5.

The transmission completion module 1270 may determine that a data transfer to the first UE is complete as described above with reference to FIGS. 2-5. In some examples, the transmission complete module may send a status transfer message, e.g., in response to the handover acknowledgement, as described above with reference to FIGS. 2-5. The context release module 1275 may receive or recognize a UE context release from the target base station as described above with reference to FIGS. 2-5. The context release module 1275 may also receive or recognize a context release, following the status transfer message and upon a successful handover, at the source base station from the target base station.

The IP address assignment module 1280 may transmit the IP address from the source base station to the UE as described above with reference to FIGS. 2-5. The context request module 1285 may receive a context request at the source base station from the target base station as described above with reference to FIGS. 2-5.

The components of base station 105-h, base station 105-i, low latency management module 1102-a, or handover management module 1104-a may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

Figure 13:
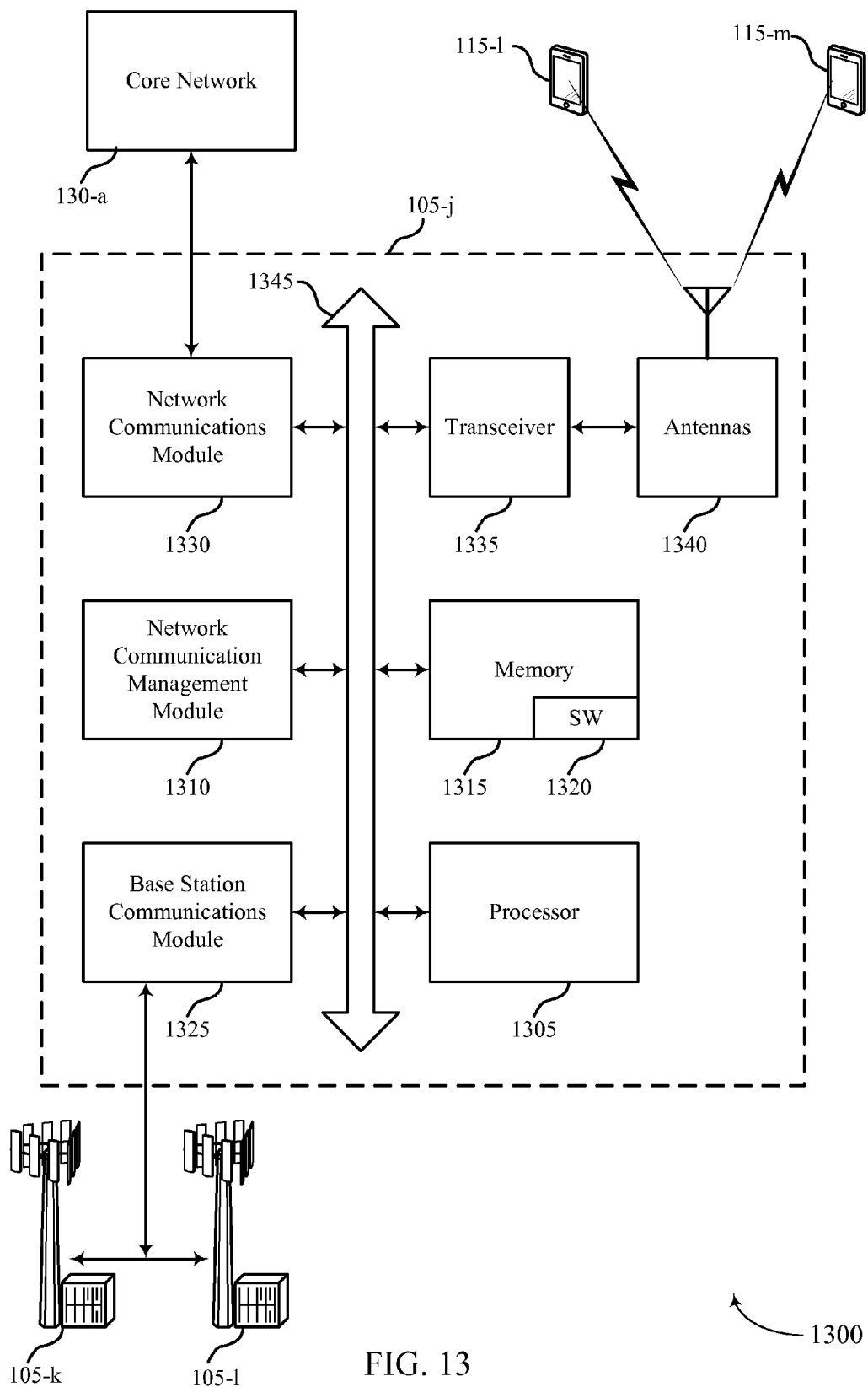
FIG. 13 illustrates a block diagram of a system including a base station configured in accordance with various aspects of the present disclosure.

FIG. 13 shows a diagram of a system 1300 including a base station 105 configured for selected IP flow ultra low latency in accordance with various aspects of the present disclosure. System 1300 may include base station 105-j, which may be an example of a base station 105 described above with reference to FIGS. 1-12. Base station 105-j may include a network communication management module 1310, which may be an example of a network communication management module 1010 described with reference to FIGS. 10-12B. Base station 105-j may also include components for bi-directional voice and data communications including components for transmitting communications and components for receiving communications. For example, base station 105-j may communicate bi-directionally with UE 115-l or UE 115-m.

In some cases, base station 105-j may have one or more wired backhaul links. Base station 105-j may have a wired backhaul link (e.g., S1 interface, etc.) to the core network 130-d, which may be an example of core network or EPC 130 described with reference to the preceding figures. Base station 105-j may also communicate with other base stations 105, such as base station 105-k and base station 105-l via inter-base station backhaul links (e.g., an X2 interface). Each of the base stations 105 may communicate with UEs 115 using the same or different wireless communications technologies. In some cases, base station 105-j may communicate with other base stations such as 105-k or 105-l utilizing base station communication module 1325. In some embodiments, base station communication module 1325 may provide an X2 interface within an LTE/LTE-A wireless communication network technology to provide communication between some of the base stations 105. In some embodiments, base station 105-j may communicate with other base stations through core network 130. In some cases, base station 105-j may communicate with the core network 130 through network communications module 1330.

The base station 105-j may include a processor module 1305, memory 1315 (including software (SW) 1320), transceiver modules 1335, and antenna(s) 1340, which each may be in communication, directly or indirectly, with one another (e.g., over bus system 1345). The transceiver modules 1335 may be configured to communicate bi-directionally, via the antenna(s) 1340, with the UEs 115, which may be multi-mode devices. The transceiver module 1335 (or other components of the base station 105-k) may also be configured to communicate bi-directionally, via the antennas 1340, with one or more other base stations (not shown). The transceiver module 1335 may include a modem configured to modulate the packets and provide the modulated packets to the antennas 1340 for transmission, and to demodulate packets received from the antennas 1340. The base station 105-j may include multiple transceiver modules 1335, each with one or more associated antennas 1340. The transceiver module may be an example of a combined receiver 1005 and transmitter 1015 of FIG. 10.

The memory 1315 may include RAM and ROM. The memory 1315 may also store computer-readable, computer-executable software code 1320 containing instructions that are configured to, when executed, cause the processor module 1305 to perform various functions described herein (e.g., selected IP flow ultra low latency, message routing, etc.). Alternatively, the software 1320 may not be directly executable by the processor module 1305 but be configured to cause the computer, e.g., when compiled and executed, to perform functions described herein. The processor module 1305 may include an intelligent hardware device, e.g., a CPU, a microcontroller, an ASIC, etc. The processor module 1305 may include various special purpose processors such as encoders, queue processing modules, base band processors, radio head controllers, digital signal processor (DSPs), and the like.

The base station communications module 1325 may manage communications with other base stations 105. The communications management module may include a controller or scheduler for controlling communications with UEs 115 in cooperation with other base stations 105. For example, the base station communications module 1325 may coordinate scheduling for transmissions to UEs 115 for various interference mitigation techniques such as beam forming or joint transmission.

Figure 14:
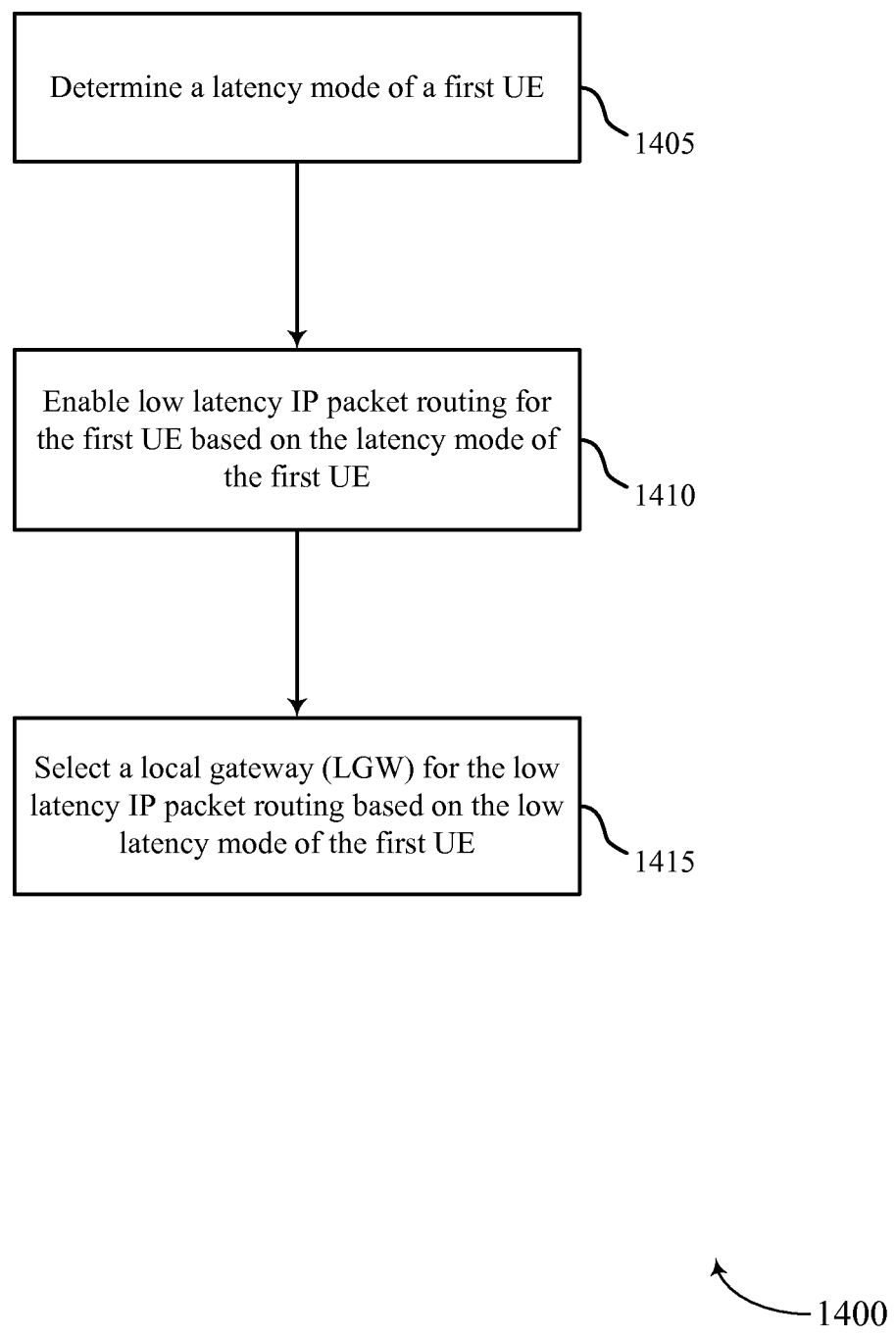
FIG. 14 shows a flowchart illustrating a method in accordance with various aspects of the present disclosure.

FIG. 14 shows a flowchart illustrating a method 1400 for selected IP flow ultra low latency in accordance with various aspects of the present disclosure. The operations of method 1400 may be implemented by a network entity, including a base station, MME, LGW, SGW, or the like, as described with reference to FIGS. 1-13. For example, the operations of method 1400 may be performed by the network communication management module 1010 as described with reference to FIGS. 10-13. In some examples, a network entity may execute a set of codes to control the functional elements of the network entity to perform the functions described below. Additionally or alternatively, the network entity may perform aspects the functions described below using special-purpose hardware.

At block 1405, a network entity may determine a latency mode of a first UE as described above with reference to FIGS. 2-5. In certain examples, the operations of block 1405 may be performed by the mode identification module 1105 as described above with reference to FIG. 11.

At block 1410, the network entity may enable low latency IP packet routing for the first UE based at least in part on the latency mode of the first UE as described above with reference to FIGS. 2-5. In some cases, the low latency IP packet routing may be enabled for an APN associated with the latency mode of the first UE. In certain examples, the operations of block 1410 may be performed by the low latency authentication module 1110 as described above with reference to FIG. 11.

At block 1415, the network entity may select a local gateway (LGW) for the low latency IP packet routing based at least in part on the low latency mode of the first UE as described above with reference to FIGS. 2-5. In some cases, LGW may be selected based on the APN. In certain examples, the operations of block 1415 may be performed by the local gateway selection module 1115 as described above with reference to FIG. 11.

Figure 15:
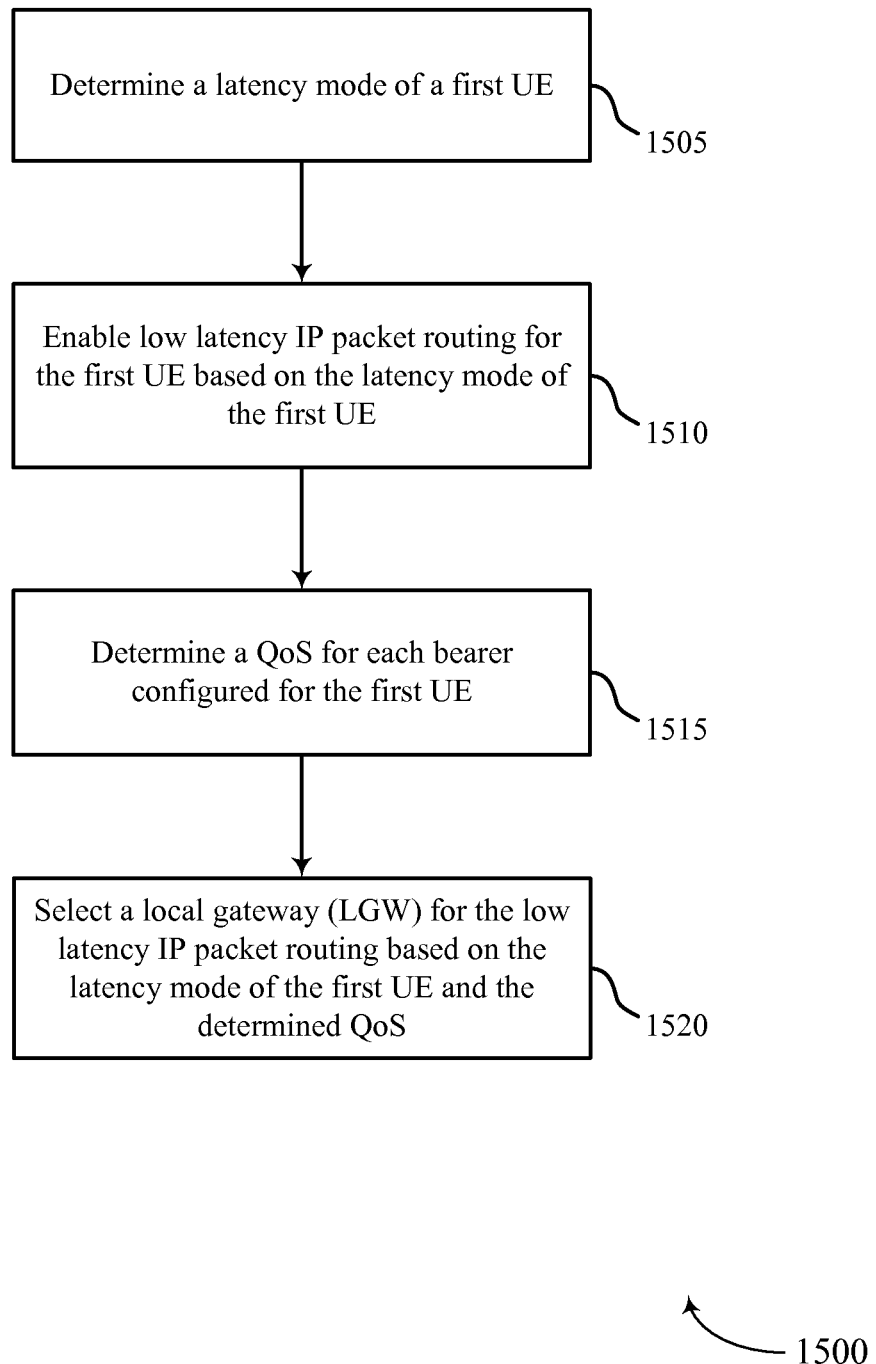
FIG. 15 shows a flowchart illustrating a method in accordance with various aspects of the present disclosure.

FIG. 15 shows a flowchart illustrating a method 1500 for selected IP flow ultra low latency in accordance with various aspects of the present disclosure. The operations of method 1800 may be implemented by a network entity, including a base station, MME, LGW, SGW, or the like, or its components, as described with reference to FIGS. 1-13. For example, the operations of method 1500 may be performed by the network communication management module 1010 as described with reference to FIGS. 10-13. In some examples, a network entity may execute a set of codes to control the functional elements of the network entity to perform the functions described below. Additionally or alternatively, the network entity may perform aspects the functions described below using special-purpose hardware. The method 1500 may also incorporate aspects of method 1400, of FIG. 14.

At block 1505, the network entity may determine a latency mode of a first UE as described above with reference to FIGS. 2-5. In certain examples, the operations of block 1505 may be performed by the mode identification module 1105 as described above with reference to FIG. 11.

At block 1510, the network entity may enable low latency IP packet routing for the first AP based at least in part on the latency mode of the first UE as described above with reference to FIGS. 2-5. In some cases, the low latency IP packet routing may be enabled for an APN associated with the latency mode of the first UE. In certain examples, the operations of block 1510 may be performed by the low latency authentication module 1110 as described above with reference to FIG. 11.

At block 1515, the network entity may determine a QoS for each bearer configured for the first UE as described above with reference to FIGS. 2-5. In certain examples, the operations of block 1515 may be performed by the QoS determination module 1205 as described above with reference to FIG. 12.

At block 1520, the network entity may select a local gateway (LGW) for the low latency IP packet routing based at least in part on the low latency mode of the first UE and the determined QoS as described above with reference to FIGS. 2-5. In some cases, LGW may be selected based on the APN as well. In certain examples, the operations of block 1520 may be performed by the local gateway selection module 1115 as described above with reference to FIG. 11. In some examples, the network entity may also cache data at the LGW.

Figure 16:
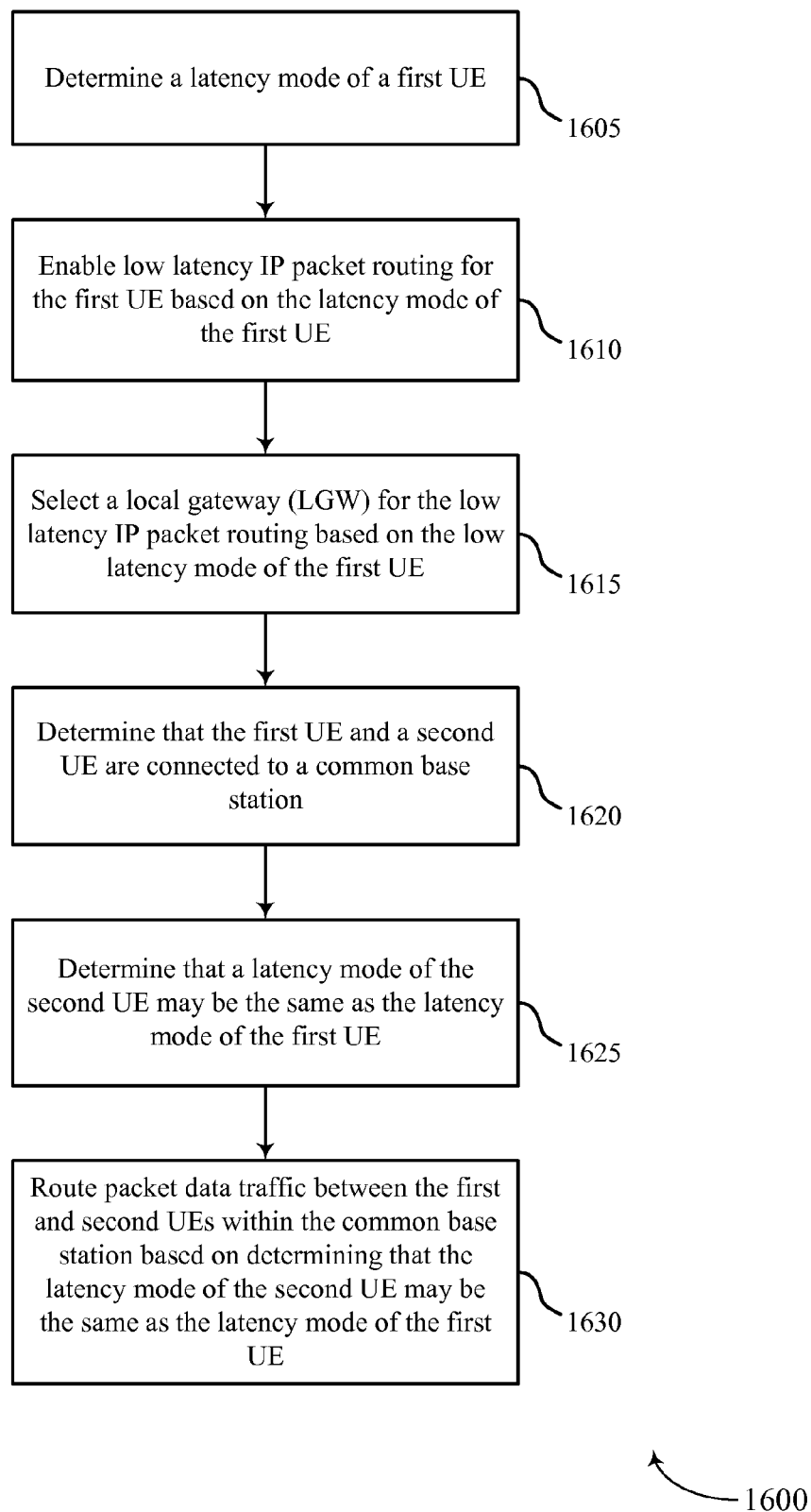
FIG. 16 shows a flowchart illustrating a method in accordance with various aspects of the present disclosure.

FIG. 16 shows a flowchart illustrating a method 1600 for selected IP flow ultra low latency in accordance with various aspects of the present disclosure. The operations of method 1600 may be implemented by a network entity, including a base station, MME, LGW, SGW, or the like, or its components, as described with reference to FIGS. 1-13. For example, the operations of method 1600 may be performed by the network communication management module 1010 as described with reference to FIGS. 10-13. In some examples, a network entity may execute a set of codes to control the functional elements of the network entity to perform the functions described below. Additionally or alternatively, the network entity may perform aspects the functions described below using special-purpose hardware. The method 1600 may also incorporate aspects of methods 1400, and 1500 of FIG. 14 or 15.

At block 1605, the network entity may determine a latency mode of a first UE as described above with reference to FIGS. 2-5. In certain examples, the operations of block 1605 may be performed by the mode identification module 1105 as described above with reference to FIG. 11.

At block 1610, the network entity may enable low latency IP packet routing for the first UE based at least in part on the latency mode of the first UE as described above with reference to FIGS. 2-5. In some cases, the low latency IP packet routing may be enabled for an APN associated with the latency mode of the first UE. In certain examples, the operations of block 1610 may be performed by the low latency authentication module 1110 as described above with reference to FIG. 11.

At block 1615, the network entity may select a local gateway (LGW) for the low latency IP packet routing based at least in part on the low latency mode of the first UE as described above with reference to FIGS. 2-5. In some cases, LGW may be selected based on the APN as well. In certain examples, the operations of block 1615 may be performed by the local gateway selection module 1115 as described above with reference to FIG. 11.

At block 1620, the network entity may determine that the first UE and a second UE are connected to a common base station as described above with reference to FIGS. 2-5. In certain examples, the operations of block 1620 may be performed by the shared eNB connectivity module 1215 as described above with reference to FIG. 12.

At block 1625, the network entity may determine that a latency mode of the second UE is the same as the latency mode of the first UE as described above with reference to FIGS. 2-5. In certain examples, the operations of block 1625 may be performed by the latency mode identification module 1220 as described above with reference to FIG. 12.

At block 1630, the network entity may route packet data traffic between the first and second UEs within the common base station based at least in part on determining that the latency mode of the second UE is the same as the latency mode of the first UE as described above with reference to FIGS. 2-5. In certain examples, the operations of block 1630 may be performed by the packet routing module 1225 as described above with reference to FIG. 12.

The method may also include determining a quality of service (QoS) for each bearer configured for the first UE and selecting the LGW based at least in part on the determined QoS. In some examples, the method may further include determining that the first UE and a second UE are connected to a common base station, determining that a latency mode of the second UE is the same as the latency mode of the first UE, and routing packet data traffic between the first and second UEs within the common base station based on determining that the latency mode of the second UE is the same as the latency mode of the first UE. In other example, the method may include determining that the first UE is connected to a first base station and a second UE is connected to a second base station, where the first and second base stations are in communication via a direct backhaul link, determining that a latency mode of the second UE is the same as the latency mode of the first UE, and routing packet data traffic between the first and second UEs over the direct backhaul link between the first and second base stations. In some cases, the routing is via the LGW and the LGW comprises a first LGW collocated with the first base station, and the method may further include selecting a second LGW collocated with the second base station and routing the packet data traffic via the first and second LGWs.

The method may also include determining that the first UE and a second UE are connected to a common serving gateway (SGW), determining that a latency mode of the second UE is the same as the latency mode of the first UE, and receiving packets routed between the first and second UEs from the SGW. In some cases, the method may include identifying a handover of the first UE from a source base station to a target base station, maintaining service continuity relating to the low latency IP packet routing during the handover, sending a handover request comprising a low latency IP routing indication from the source base station to the target base station, and receiving a handover acknowledgment comprising the low latency IP routing indication from the target base station at the source base station. In further examples, the method may include selecting the target base station, by the source base station, based at least in part on a capability of the target base station to support the low latency IP packet routing, sending a handover request comprising a low latency IP routing indication from the source base station to the target base station, receiving a handover acknowledgment comprising the low latency IP routing indication and an IP address from the target base station at the source base station, and transmitting the IP address from the source base station to the first UE.

Figure 17:
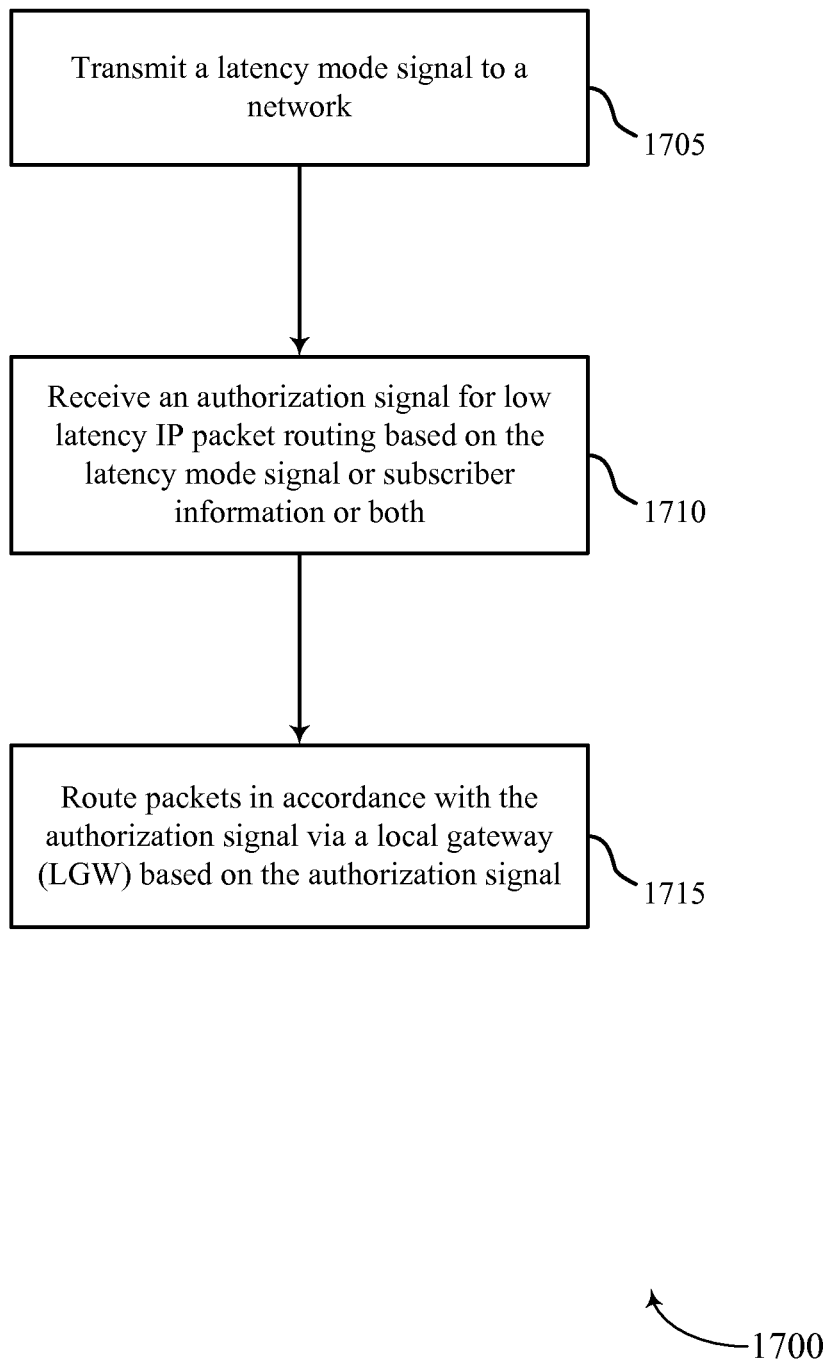
FIG. 17 shows a flowchart illustrating a method in accordance with various aspects of the present disclosure.

FIG. 17 shows a flowchart illustrating a method 1700 for selected IP flow ultra low latency in accordance with various aspects of the present disclosure. The operations of method 1700 may be implemented by a UE or its components as described with reference to FIGS. 1-13. For example, the operations of method 1700 may be performed by the communication management module 610 as described with reference to FIGS. 6-9. In some examples, a UE may execute a set of codes to control the functional elements of the UE to perform the functions described below. Additionally or alternatively, the UE may perform aspects the functions described below using special-purpose hardware.

At block 1705, the UE may transmit a latency mode signal to a network as described above with reference to FIGS. 2-5. In certain examples, the operations of block 1705 may be performed by the latency mode transmission module 705 as described above with reference to FIG. 7.

At block 1710, the UE may receive an authorization signal for low latency IP packet routing based at least in part on the latency mode signal as described above with reference to FIGS. 2-5. In some cases, the low latency IP packet routing may be authorized for an APN based on the latency mode signal or subscriber information, or both. In certain examples, the operations of block 1710 may be performed by the authorization reception module 710 as described above with reference to FIG. 7.

At block 1715, the UE may route packets in accordance with the authorization signal via a local gateway (LGW) based at least in part on the authorization signal as described above with reference to FIGS. 2-5. In certain examples, the operations of block 1715 may be performed by the communication module 715 as described above with reference to FIG. 7.

Figure 18:
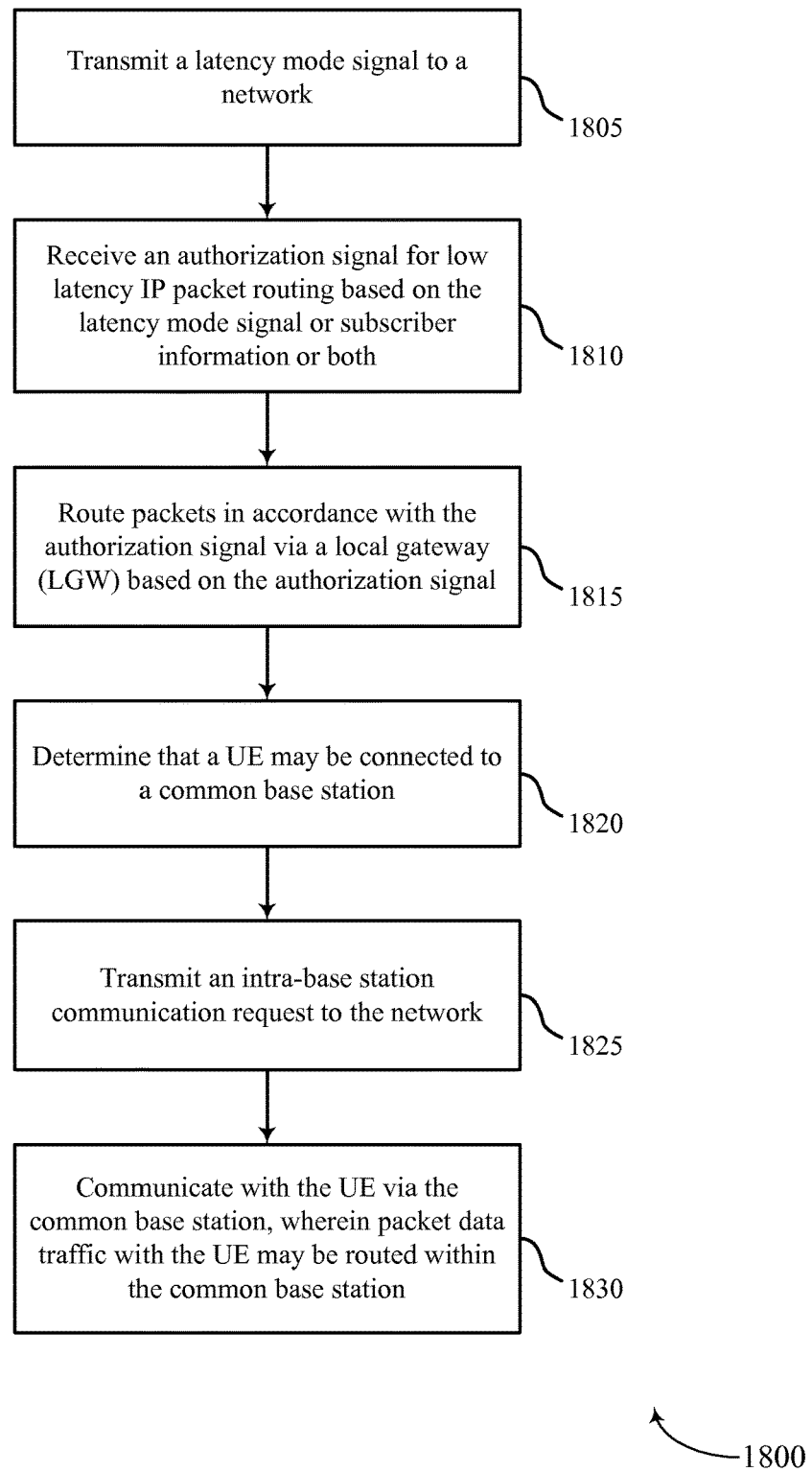
FIG. 18 shows a flowchart illustrating a method in accordance with various aspects of the present disclosure.

FIG. 18 shows a flowchart illustrating a method 1800 for selected IP flow ultra low latency in accordance with various aspects of the present disclosure. The operations of method 1800 may be implemented by a UE or its components as described with reference to FIGS. 1-13. For example, the operations of method 1800 may be performed by the communication management module 610 as described with reference to FIGS. 6-9. In some examples, a UE 115 may execute a set of codes to control the functional elements of the UE to perform the functions described below. Additionally or alternatively, the UE may perform aspects the functions described below using special-purpose hardware.

At block 1805, the UE may transmit a latency mode signal to a network as described above with reference to FIGS. 2-5. In certain examples, the operations of block 1805 may be performed by the latency mode transmission module 705 as described above with reference to FIG. 7.

At block 1810, the UE may receive an authorization signal for low latency IP packet routing based at least in part on the latency mode signal as described above with reference to FIGS. 2-5. In some cases, the low latency IP packet routing may be authorized for an APN based on the latency mode signal or subscriber information or both. In certain examples, the operations of block 1810 may be performed by the authorization reception module 710 as described above with reference to FIG. 7.

At block 1815, the UE may route packets in accordance with the authorization signal via a local gateway (LGW) based at least in part on the authorization signal as described above with reference to FIGS. 2-5. In certain examples, the operations of block 1815 may be performed by the communication module 715 as described above with reference to FIG. 7.

At block 1820, the UE may determine that a UE is connected to a common base station as described above with reference to FIGS. 2-5. In certain examples, the operations of block 1820 may be performed by the inter-base station identification module 810 as described above with reference to FIG. 8.

At block 1825, the UE may transmit an intra-base station communication request to the network as described above with reference to FIGS. 2-5. In certain examples, the operations of block 1825 may be performed by the communication establishment module 815 as described above with reference to FIG. 8.

At block 1830, the UE may communicate with the UE via the common base station, wherein packet data traffic with the UE is routed within the common base station as described above with reference to FIGS. 2-5. In certain examples, the operations of block 1830 may be performed by the routing module 820 as described above with reference to FIG. 8.

Figure 19:
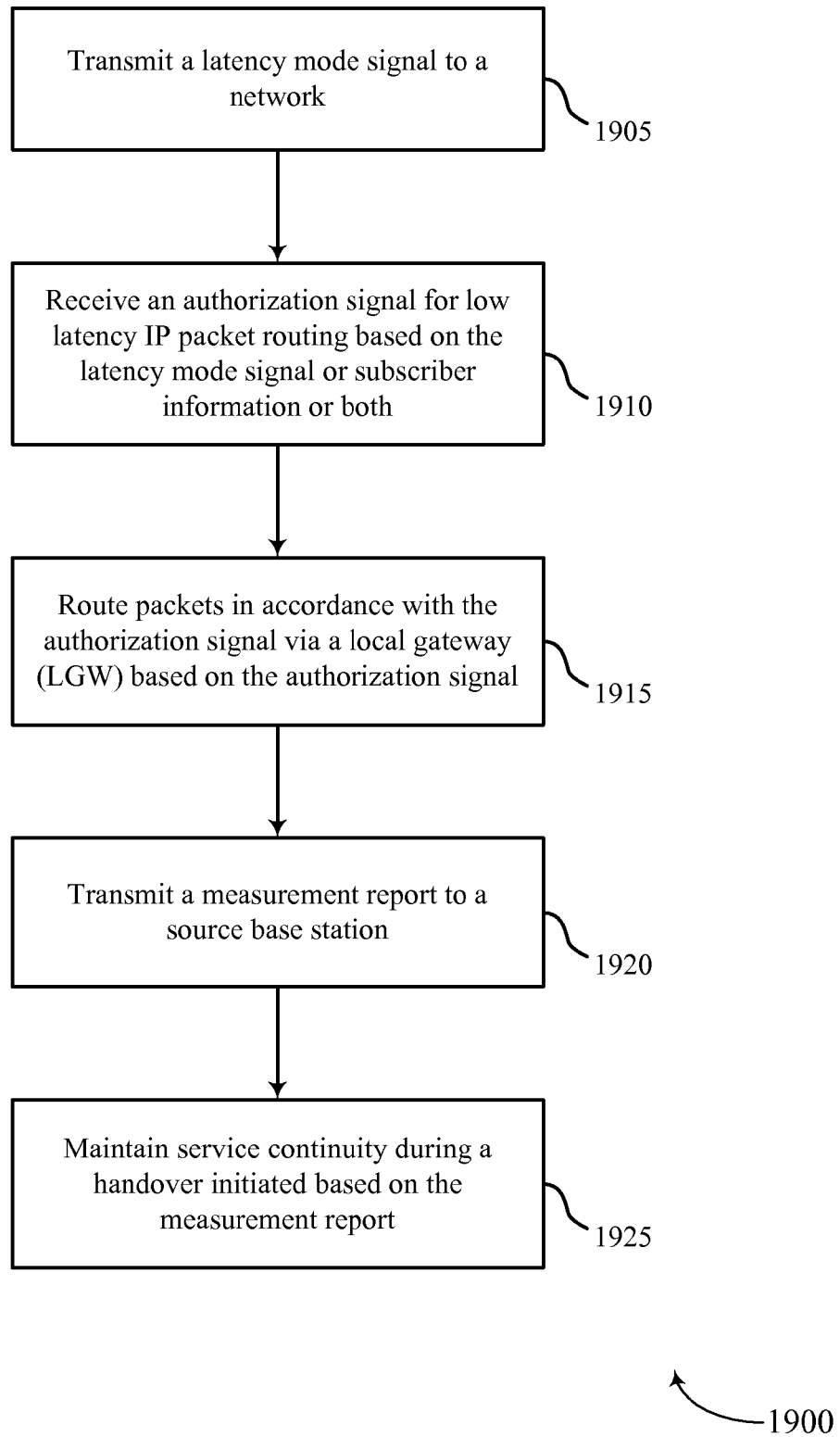
FIG. 19 shows a flowchart illustrating a method in accordance with various aspects of the present disclosure.

FIG. 19 shows a flowchart illustrating a method 1900 for selected IP flow ultra low latency in accordance with various aspects of the present disclosure. The operations of method 1900 may be implemented by a UE or its components as described with reference to FIGS. 1-13. For example, the operations of method 1800 may be performed by the communication management module 610 as described with reference to FIGS. 6-9. In some examples, a UE may execute a set of codes to control the functional elements of the UE to perform the functions described below. Additionally or alternatively, the UE may perform aspects the functions described below using special-purpose hardware.

At block 1905, the UE may transmit a latency mode signal to a network as described above with reference to FIGS. 2-5. In certain examples, the operations of block 1905 may be performed by the latency mode transmission module 705 as described above with reference to FIG. 7.

At block 1910, the UE may receive an authorization signal for low latency IP packet routing based at least in part on the latency mode signal as described above with reference to FIGS. 2-5. In some cases, the low latency IP packet routing may be authorized for an APN based on the latency mode signal or subscriber information or both. In certain examples, the operations of block 1910 may be performed by the authorization reception module 710 as described above with reference to FIG. 7.

At block 1915, the UE may route packets in accordance with the authorization signal via a local gateway (LGW) based at least in part on the authorization signal as described above with reference to FIGS. 2-5. In certain examples, the operations of block 1915 may be performed by the communication module 715 as described above with reference to FIG. 7.

At block 1920, the UE may transmit a measurement report to a source base station as described above with reference to FIGS. 2-5. In certain examples, the operations of block 1920 may be performed by the measurement report module 825 as described above with reference to FIG. 8.

At block 1925, the UE may maintain service continuity during a handover initiated based at least in part on the measurement report as described above with reference to FIGS. 2-5. In certain examples, the operations of block 1925 may be performed by the continuity establishment module 830 as described above with reference to FIG. 8.

In some examples, the method may further include transmitting a quality of service (QoS) indication to the network, wherein the authorization signal is based at least in part on the QoS indication. In some cases, the LGW comprises a source LGW associated with a source base station, and the method may further include receiving a new IP address allocation from a target LGW associated with a target base station, transmitting uplink data to the target base station utilizing an IP address allocated by the source LGW, receiving downlink data from the target base station utilizing the IP address allocated by the source LGW, wherein the downlink data is routed via the source base station, and receiving an indication from a mobility management entity (MME) to utilize the new IP address. In other examples, the method may include receiving a new IP address allocated from a target LGW associated with a target base station, reestablishing a radio resource control (RRC) connection with the target base station, and communicating with the target base station utilizing the new IP address allocated from the target LGW. In yet further examples, the method may include receiving, from a mobility management entity (MME), a new IP address allocated from a target LGW associated with a target base station, reestablishing a radio resource control (RRC) connection with the target base station, and communicating with the target base station utilizing the new IP address allocated from the target LGW.

Thus, methods 1400, 1500, 1600, 1700, 1800, and 1900 may provide for selected IP flow ultra low latency. It should be noted that methods 1400, 1500, 1600, 1700, 1800, and 1900 describe possible implementation, and that the operations and the steps may be rearranged or otherwise modified such that other implementations are possible. In some examples, aspects from two or more of the methods 1400, 1500, 1600, 1700, 1800, and 1900 may be combined.

The detailed description set forth above in connection with the appended drawings describes example embodiments and does not represent all the embodiments that may be implemented or that are within the scope of the claims. The term "exemplary," as used herein, means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable read only memory (EEPROM), compact disk (CD) ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method of wireless communication, comprising:
   receiving an indication of a latency capability of a first user equipment (UE);
   determining, based at least in part on the receiving, a low latency capability of the first UE;
   determining, based at least in part on the determined low latency capability of the first UE, a latency mode of the first UE;
   enabling low latency internet protocol (IP) packet routing for the first UE based at least in part on the latency mode and the low latency capability of the first UE; and
   selecting a local gateway (LGW) for the low latency IP packet routing based at least in part on the latency mode and the low latency capability of the first UE.

2. The method of claim 1, wherein the low latency IP packet routing is enabled for an access point name (APN) associated with the latency mode of the first UE, and wherein the LGW is selected based at least in part on the APN.

3. The method of claim 1, further comprising:
   determining a quality of service (QoS) for each bearer configured for the first UE; and
   selecting the LGW based at least in part on the determined QoS.

4. The method of claim 1, further comprising:
   determining that the first UE and a second UE are connected to a common base station;
   determining that a latency mode of the second UE is the same as the latency mode of the first UE; and
   routing packet data traffic between the first and second UEs within the common base station based at least in part on determining that the latency mode of the second UE is the same as the latency mode of the first UE.

5. The method of claim 1, further comprising:
   determining that the first UE is connected to a first base station and a second UE is connected to a second base station, wherein the first and second base stations are in communication via a direct backhaul link;
   determining that a latency mode of the second UE is the same as the latency mode of the first UE; and
   routing packet data traffic between the first and second UEs over the direct backhaul link between the first and second base stations.

6. The method of claim 5, wherein the routing is via the LGW and the LGW comprises a first LGW collocated with the first base station, the method further comprising:
   selecting a second LGW collocated with the second base station; and
   routing the packet data traffic via the first and second LGWs.

7. The method of claim 1, further comprising:
   determining that the first UE and a second UE are connected to a common serving gateway (SGW);
   determining that a latency mode of the second UE is the same as the latency mode of the first UE; and
   receiving packets routed between the first and second UEs from the SGW.

8. The method of claim 1, further comprising:
   identifying a handover of the first UE from a source base station to a target base station; and
   maintaining service continuity relating to the low latency IP packet routing during the handover.

9. The method of claim 8, further comprising:
   sending a handover request comprising a low latency IP routing indication from the source base station to the target base station; and receiving a handover acknowledgment comprising the low latency IP routing indication from the target base station at the source base station.

10. The method of claim 8, further comprising:
selecting the target base station, by the source base station, based at least in part on a capability of the target base station to support the low latency IP packet routing.

11. The method of claim 8, further comprising:
sending a handover request comprising a low latency IP routing indication from the source base station to the target base station;
receiving a handover acknowledgment comprising the low latency IP routing indication and an IP address from the target base station at the source base station; and
transmitting the IP address from the source base station to the first UE.

12. An apparatus for wireless communication, comprising:
a processor;
memory in electronic communication with the processor; and
instructions stored in the memory; wherein the instructions are executable by the processor to cause the apparatus to:
receive an indication of a latency capability of a first user equipment (UE);
determine, based at least in part on the receiving, a low latency capability of the first UE;
determine, based at least in part on the determined low latency capability of the first UE, a latency mode of the first UE;
enable low latency internet protocol (IP) packet routing for the first UE based at least in part on the latency mode and the low latency capability of the first UE; and
select a local gateway (LGW) for the low latency IP packet routing based at least in part on the latency mode and the low latency capability of the first UE.

13. The apparatus of claim 12, wherein the instructions are executable by the processor to cause the apparatus to:
enable the low latency IP packet routing for an access point name (APN) associated with the latency mode of the first UE; and
select the LGW based at least in part on the APN.

14. The apparatus of claim 12, wherein the instructions are executable by the processor to cause the apparatus to:
determine a quality of service (QoS) for each bearer configured for the first UE; and
select the LGW based at least in part on the determined QoS.

15. The apparatus of claim 12, wherein the instructions are executable by the processor to cause the apparatus to:
determine that the first UE and a second UE are connected to a common base station;
determine that a latency mode of the second UE is the same as the latency mode of the first UE; and
route packet data traffic between the first and second UEs within the common base station based at least in part on determining that the latency mode of the second UE is the same as the latency mode of the first UE.

16. The apparatus of claim 12, wherein the instructions are executable by the processor to cause the apparatus to:
determine that the first UE is connected to a first base station and a second UE is connected to a second base station, wherein the first and second base stations are in communication via a direct backhaul link;
determine that a latency mode of the second UE is the same as the latency mode of the first UE; and
route packet data traffic between the first and second UEs over the direct backhaul link between the first and second base stations.

17. The apparatus of claim 16, wherein the routing is via the LGW and the LGW comprises a first LGW collocated with the first base station, wherein the instructions are executable by the processor to cause the apparatus to:
select a second LGW collocated with the second base station; and
route the packet data traffic via the first and second LGWs.

18. The apparatus of claim 12, wherein the instructions are executable by the processor to cause the apparatus to:
determine that the first UE and a second UE are connected to a common serving gateway (SGW);
determine that a latency mode of the second UE is the same as the latency mode of the first UE; and
route packet data traffic between the first and second UEs within the SGW.

19. The apparatus of claim 12, wherein the instructions are executable by the processor to cause the apparatus to:
identify a handover of the first UE from a source base station to a target base station; and
maintain service continuity during the handover.

20. The apparatus of claim 19, wherein the instructions are executable by the processor to cause the apparatus to:
send a handover request comprising a low latency IP routing indication from the source base station to the target base station; and
receive a handover acknowledgment comprising the low latency IP routing indication from the target base station at the source base station.

21. The apparatus of claim 19, wherein the instructions are executable by the processor to cause the apparatus to:
select the target base station, by the source base station, based at least in part on a capability of the target base station to support the low latency IP packet routing.

22. The apparatus of claim 19, wherein the instructions are executable by the processor to cause the apparatus to:
send a handover request comprising a low latency IP routing indication from the source base station to the target base station;
receive a handover acknowledgment comprising the low latency IP routing indication and an IP address from the target base station at the source base station; and
transmit the IP address from the source base station to the first UE.

23. A method of wireless communication at a user equipment (UE), comprising:
transmitting a latency mode signal and an indication of a latency capability of the UE to a network;
receiving, based at least in part on the transmitted latency mode signal and a low latency capability of the UE based at least in part on the indication, an authorization signal for low latency internet protocol (IP) packet routing based at least in part on the latency mode signal and the low latency capability; and
routing packets in accordance with the authorization signal via a local gateway (LGW) based at least in part on the authorization signal.

24. The method of claim 23, wherein the low latency IP packet routing is authorized for an access point name (APN) based at least in part on the latency mode signal or subscriber information, or both.

25. The method of claim 23, further comprising:
transmitting a quality of service (QoS) indication to the network, wherein the authorization signal is based at least in part on the QoS indication.

26. The method of claim 23, further comprising:
transmitting a measurement report to a source base station; and
maintaining service continuity during a handover initiated based at least in part on the measurement report.

27. The method of claim 26, further comprising:
receiving a new IP address allocated from a target LGW associated with a target base station;
reestablishing a radio resource control (RRC) connection with the target base station; and
communicating with the target base station utilizing the new IP address allocated from the target LGW.

28. The method of claim 23, wherein the LGW comprises a source LGW associated with a source base station, the method further comprising:
receiving a new IP address allocation from a target LGW associated with a target base station;
transmitting uplink data to the target base station utilizing an IP address allocated by the source LGW;
receiving downlink data from the target base station utilizing the IP address allocated by the source LGW, wherein the downlink data is routed via the source base station; and
receiving an indication from a mobility management entity (MME) to utilize the new IP address.

29. The method of claim 23, further comprising:
receiving, from a mobility management entity (MME), a new IP address allocated from a target LGW associated with a target base station;
reestablishing a radio resource control (RRC) connection with the target base station; and
communicating with the target base station utilizing the new IP address allocated from the target LGW.

30. An apparatus for wireless communication at a user equipment (UE), comprising:
a processor;
memory in electronic communication with the processor; and
instructions stored in the memory; wherein the instructions are executable by the processor to cause the apparatus to:
transmit a latency mode signal and a latency capability of the UE to a network;
receive, based at least in part on the transmitted latency mode signal and a low latency capability of the UE based at least in part on the indication, an authorization signal for low latency internet protocol (IP) packet routing based at least in part on the latency mode signal and the low latency capability; and
communicate with the network via a local gateway (LGW) based at least in part on the authorization signal.

* * * * *